(12) United States Patent
Yu et al.

(10) Patent No.: US 10,841,819 B2
(45) Date of Patent: Nov. 17, 2020

(54) SCENARIO ADAPTIVE DOWNLINK BEAM MANAGEMENT SCHEDULING

(71) Applicant: Intel Corporation, Santa Clara, CA (US)

(72) Inventors: Zhibin Yu, Unterhaching (DE); Michael Ruder, Pommelsbrunn (DE)

(73) Assignee: INTEL CORPORATION, Santa Clara, CA (US)

( * ) Notice: Subject to any disclaimer, the term of this patent is extended or adjusted under 35 U.S.C. 154(b) by 7 days.

(21) Appl. No.: 16/118,531

(22) Filed: Aug. 31, 2018

(65) Prior Publication Data

US 2020/0077285 A1 Mar. 5, 2020

(51) Int. Cl.
| | |
|---|---|
| *G06F 11/00* | (2006.01) |
| *H04W 24/08* | (2009.01) |
| *H04W 16/28* | (2009.01) |
| *H04W 72/12* | (2009.01) |

(52) U.S. Cl.
CPC .......... *H04W 24/08* (2013.01); *H04W 16/28* (2013.01); *H04W 72/12* (2013.01)

(58) Field of Classification Search
CPC ...... H04W 24/08; H04W 16/28; H04W 72/12
USPC .......................................... 370/252, 253, 254
See application file for complete search history.

(56) References Cited

U.S. PATENT DOCUMENTS

| | | | | |
|---|---|---|---|---|
| 10,091,757 | B2* | 10/2018 | Takahashi | H04W 4/027 |
| 10,568,101 | B2* | 2/2020 | Takahashi | H04B 7/0695 |
| 2005/0182847 | A1* | 8/2005 | Jawad Pirzada | H04L 43/08 709/233 |
| 2016/0174208 | A1* | 6/2016 | Kim | H04L 47/225 370/329 |
| 2017/0264357 | A1* | 9/2017 | Takahashi | H04B 17/336 |
| 2017/0317727 | A1* | 11/2017 | Wang | H04B 7/0617 |
| 2018/0132116 | A1* | 5/2018 | Shekhar | H04W 24/02 |
| 2018/0191422 | A1 | 7/2018 | Xia et al. | |
| 2018/0192411 | A1* | 7/2018 | Takahashi | H04B 7/088 |
| 2018/0242273 | A1* | 8/2018 | Takahashi | H04B 17/27 |

(Continued)

FOREIGN PATENT DOCUMENTS

WO 2019094289 A1 5/2019

OTHER PUBLICATIONS

Apple Inc, "Discussion on beam measurement and reporting", 3rd Generation Partnership Generation Project (3GPP), Apr. 2018, 4 pages, 3GPP TSG RAN WG1 Meeting #92bis, R1-1804770, Sanya, China.

(Continued)

*Primary Examiner* — Chuong T Ho
(74) *Attorney, Agent, or Firm* — Viering, Jentschura & Partner mbB

(57) ABSTRACT

Herein is disclosed a wireless communication device comprising two or more antennas, configured to receive a wireless signal; one or more receivers, configured to detect position data indicating a position of the wireless communication device and to process the wireless signal for one or more processors; the one or more processors, configured to determine a signal quality of the wireless signal; determine a position change information of a position of the wireless communication device based on the detected position data; and select a beam selection protocol from a plurality of beam selection protocols based on at least the signal quality and the position change information.

21 Claims, 10 Drawing Sheets

(56) References Cited

U.S. PATENT DOCUMENTS

2018/0331805 A1* 11/2018 Xia .................... H04W 72/042
2019/0081686 A1*  3/2019 Wang .................. H04W 76/25
2019/0104507 A1*  4/2019 Majmundar .......... H04W 36/06
2019/0253108 A1*  8/2019 Zhang ................. H04B 7/0404
2019/0274127 A1*  9/2019 Nammi ............... H04W 72/046

OTHER PUBLICATIONS

European Search Report issued for the corresponding EP application No. 19 183 483.7 dated Nov. 22, 2019, 2 pages.
Intel Corporation, "Details on Beam Management", 3rd Generation Partnership Generation Project (3GPP), Jun. 2017, 7 pages, TSG-RAN WG1 NR AdHoc #2, R1-1710526, Qingdao, China.

* cited by examiner

SCENARIO ADAPTIVE DOWNLINK BEAM MANAGEMENT SCHEDULING

TECHNICAL FIELD

Various embodiments relate generally to methods and devices for beam selection in a mobile device.

BACKGROUND

Standards and discussions for 5th Generation Wireless technology ("5G") include procedures for selection of transmit beams for transmissions from a base station to a mobile device and selection of receive beams for receipt of these transmissions. Such selection of transmit beams may be referred to as Downlink (DL) Beam Management (BM). A goal of Beam Management is to find a best beam pair between the transmit antennas of the base station and the receive antennas of the user equipment. The standards do not prescribe a specific beam management method, but rather provide a flexibility in implementation. The known methods of beam management may be costly in terms of time or resources.

SUMMARY

Herein is disclosed a wireless communication device comprising two or more antennas, configured to receive a wireless signal; one or more receivers, configured to detect position data indicating a position of the wireless communication device and to process the wireless signal for one or more processors; the one or more processors, configured to determine a signal quality of the wireless signal; determine a position change information of a position of the wireless communication device based on the detected position data; and select a beam selection protocol from a plurality of beam selection protocols based on at least the signal quality and the position change information.

BRIEF DESCRIPTION OF THE DRAWINGS

In the drawings, like reference characters generally refer to the same parts throughout the different views. The drawings are not necessarily to scale, emphasis instead generally being placed upon illustrating the principles of the Disclosure. In the following description, various aspects of the Disclosure are described with reference to the following drawings, in which.

DESCRIPTION

Figure 1A:
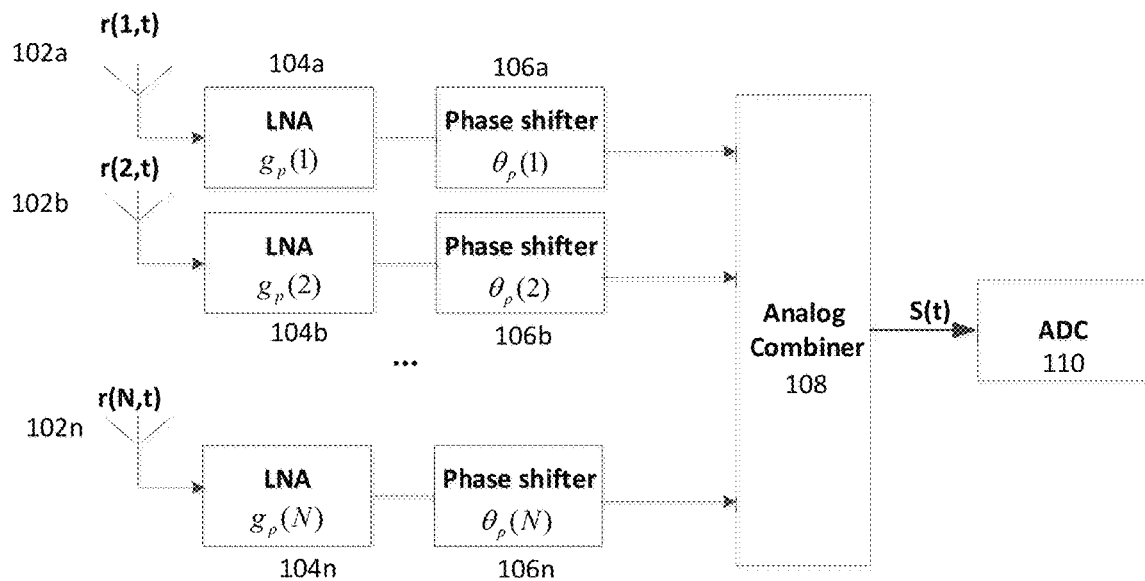
FIG. 1A shows an analog beamforming system for a receive beam.

The following detailed description refers to the accompanying drawings that show, by way of illustration, specific details and embodiments in which the invention may be practiced.

The word "exemplary" is used herein to mean "serving as an example, instance, or illustration". Any embodiment or design described herein as "exemplary" is not necessarily to be construed as preferred or advantageous over other embodiments or designs.

The words "plural" and "multiple" in the description and the claims expressly refer to a quantity greater than one. Accordingly, any phrases explicitly invoking the aforementioned words (e.g. "a plurality of [objects]", "multiple [objects]") referring to a quantity of objects expressly refers more than one of the said objects. The terms "group (of)", "set [of]", "collection (of)", "series (of)", "sequence (of)", "grouping (of)", etc., and the like in the description and in the claims, if any, refer to a quantity equal to or greater than one, i.e. one or more. The terms "proper subset", "reduced subset", and "lesser subset" refer to a subset of a set that is not equal to the set, i.e. a subset of a set that contains less elements than the set.

It is appreciated that any vector and/or matrix notation utilized herein is exemplary in nature and is employed solely for purposes of explanation. Accordingly, it is understood that the approaches detailed in this disclosure are not limited to being implemented solely using vectors and/or matrices, and that the associated processes and computations may be equivalently performed with respect to sets, sequences, groups, etc., of data, observations, information, signals, samples, symbols, elements, etc. Furthermore, it is appreciated that references to a "vector" may refer to a vector of any size or orientation, e.g. including a 1×1 vector (e.g. a scalar), a 1×M vector (e.g. a row vector), and an M×1 vector (e.g. a column vector). Similarly, it is appreciated that references to a "matrix" may refer to matrix of any size or orientation, e.g. including a 1×1 matrix (e.g. a scalar), a 1×M matrix (e.g. a row vector), and an M×1 matrix (e.g. a column vector).

A "circuit" as used herein is understood as any kind of logic-implementing entity, which may include special-purpose hardware or a processor executing software. A circuit may thus be an analog circuit, digital circuit, mixed-signal circuit, logic circuit, processor, microprocessor, Central Processing Unit (CPU), Graphics Processing Unit (GPU), Digital Signal Processor (DSP), Field Programmable Gate Array (FPGA), integrated circuit, Application Specific Integrated Circuit (ASIC), etc., or any combination thereof. Any other kind of implementation of the respective functions which will be described below in further detail may also be understood as a "circuit". It is understood that any two (or more) of the circuits detailed herein may be realized as a single circuit with substantially equivalent functionality, and conversely that any single circuit detailed herein may be realized as two (or more) separate circuits with substantially equivalent functionality. Additionally, references to a "circuit" may refer to two or more circuits that collectively form a single circuit. The term "circuit arrangement" may refer to a single circuit, a collection of circuits, and/or an electronic device composed of one or more circuits.

As used herein, "memory" may be understood as a non-transitory computer-readable medium in which data or information can be stored for retrieval. References to "memory" included herein may thus be understood as referring to volatile or non-volatile memory, including random access memory (RAM), read-only memory (ROM), flash memory, solid-state storage, magnetic tape, hard disk drive, optical drive, etc., or any combination thereof. Furthermore, it is appreciated that registers, shift registers, processor registers, data buffers, etc., are also embraced herein by the term memory. It is appreciated that a single component referred to as "memory" or "a memory" may be composed of more than one different type of memory, and thus may refer to a collective component comprising one or more types of memory. It is readily understood that any single memory component may be separated into multiple collectively equivalent memory components, and vice versa. Furthermore, while memory may be depicted as separate from one or more other components (such as in the drawings), it is understood that memory may be integrated within another component, such as on a common integrated chip.

The term "base station" used in reference to an access point of a mobile communication network may be understood as a macro base station, micro base station, Node B, evolved NodeB (eNB), Home eNodeB, Remote Radio Head (RRH), relay point, etc. As used herein, a "cell" in the context of telecommunications may be understood as a sector served by a base station. Accordingly, a cell may be a set of geographically co-located antennas that correspond to a particular sectorization of a base station. A base station may thus serve one or more cells (or sectors), where each cell is characterized by a distinct communication channel. Furthermore, the term "cell" may be utilized to refer to any of a macrocell, microcell, femtocell, picocell, etc.

For purposes of this disclosure, radio communication technologies may be classified as one of a Short Range radio communication technology, Metropolitan Area System radio communication technology, or Cellular Wide Area radio communication technology. Short Range radio communication technologies include Bluetooth, WLAN (e.g. according to any IEEE 802.11 standard), and other similar radio communication technologies. Metropolitan Area System radio communication technologies include Worldwide Interoperability for Microwave Access (WiMax) (e.g. according to an IEEE 802.16 radio communication standard, e.g. WiMax fixed or WiMax mobile) and other similar radio communication technologies. Cellular Wide Area radio communication technologies include Global System for Mobile Communications (GSM), Code Division Multiple Access 2000 (CDMA2000), Universal Mobile Telecommunications System (UMTS), Long Term Evolution (LTE), General Packet Radio Service (GPRS), Evolution-Data Optimized (EV-DO), Enhanced Data Rates for GSM Evolution (EDGE), High Speed Packet Access (HSPA), etc., and other similar radio communication technologies. Cellular Wide Area radio communication technologies also include "small cells" of such technologies, such as microcells, femtocells, and picocells. Cellular Wide Area radio communication technologies may be generally referred to herein as "cellular" communication technologies. It is understood that exemplary scenarios detailed herein are demonstrative in nature, and accordingly may be similarly applied to various other mobile communication technologies, both existing and not yet formulated, particularly in cases where such mobile communication technologies share similar features as disclosed regarding the following examples.

The term "network" as utilized herein, e.g. in reference to a communication network such as a mobile communication network, encompasses both an access section of a network (e.g. a radio access network (RAN) section) and a core section of a network (e.g. a core network section). The term "radio idle mode" or "radio idle state" used herein in reference to a mobile terminal refers to a radio control state in which the mobile terminal is not allocated at least one dedicated communication channel of a mobile communication network. The term "radio connected mode" or "radio connected state" used in reference to a mobile terminal refers to a radio control state in which the mobile terminal is allocated at least one dedicated uplink communication channel of a mobile communication network.

Unless explicitly specified, the term "transmit" encompasses both direct (point-to-point) and indirect transmission (via one or more intermediary points). Similarly, the term "receive" encompasses both direct and indirect reception. The term "communicate" encompasses one or both of transmitting and receiving, i.e. unidirectional or bidirectional communication in one or both of the incoming and outgoing directions.

As described herein, the term "mobility" may refer to any of movement of a user device relative to a base station, a velocity of user device movement relative to a base station, an acceleration of the user device relative to a base station, a rotation of the user device around one or more axes, or any combination thereof.

Antenna-based communication systems may utilize beamforming in order to create steered antenna beams with an antenna array. Beamforming systems may adjust the delay and/or gain of each of the signals transmitted by (or received with in the receive direction) the elements of an antenna array in order to create patterns of constructive and destructive inference at certain angular directions. Through precise selection of the delays and gains of each antenna element, a beamforming architecture may control the resulting interference pattern in order to realize a steerable "main lobe" that provides high beam gain in a particular direction. Many beamforming systems may allow for adaptive control of the beam pattern through dynamic adjustment of the delay and gain parameters for each antenna element, and accordingly may allow a beamformer to constantly adjust the steering direction of the beam such as in order to track movement of a transmitter or receiver of interest.

Beamforming architectures may conventionally employ one or both of digital and radio frequency (RF) processing in order to apply the desired delay and gain factors at each element of the array. Phased antenna arrays are a particularly favored RF beamforming technique for narrowband signals which relies on the approximate equivalence between phase shifts and time delays for narrowband signals. Accordingly, phased antenna arrays may place an RF phase shifter in the signal path of each antenna element and allow the individual phase shift values to be adjusted in order to steer the resulting antenna beam. Although many phased array designs achieve sufficient performance with phase-only control, variable gain amplifiers and other techniques such as tapering may additionally be implemented in order to also allow for gain adjustment.

Beamforming systems have been targeted as a potentially important component in high frequency next-generation communication networks such as millimeter wave (mmWave) and other so-called "5G" radio technologies. These radio technologies may operate at carrier frequencies of 30 GHz and above, and may need to rely on high beamforming gains in order to compensate for the high path loss associated with carrier frequencies in these ranges.

UE RX Analog beam forming is one major feature introduced by 5G NR mmWave band (FR2) communications. Analog beamforming may be achieved by antenna arrays within a user device (also named as antenna panels) as shown in FIG. 1A. In the system model of FIG. 1A, N is the number of antenna elements within one antenna array, as depicted by Antenna 1 $102a$, Antenna 2 $102b$, and up to the Nth Antenna $102n$. The formula $r(k,t)$, $k=1, 2, \ldots, N$ is the received analog signal on each antenna element within the antenna array at time t. A vector of phase configurations $\theta_p(k)$, $k=1, 2, \ldots, N$ from a corresponding phase shifter 106*a*, 106*b*, 106*n* and Low Noise Amplifier ("LNA") gain configurations $g^p(k), k=1, 2, \ldots, N, g_p(k) \geq 0$ from LNAs 104*a*, 104*b*, and 104*n* for the antenna elements within the antenna array is called one analog code-word (a phase vector+a gain vector). For each code-word p, the analog beam-formed RX signal at UE receiver side is then represented as the following form:

$$s(t) = \sum_{k=1}^{N} r(k, t) \cdot g_p(k) \cdot e^{j\theta_p(k)} \quad (1)$$

The user device can pre-optimize a set of analog code-words (called an analog code-book), e.g. by lab calibrations and or lab testing, and store the pre-optimized code-book in its memory. Each code-word is associated with one UE RX beam. Different code-words can be associated with different UE RX beams pointing in different spatial directions, but can also be associated with RX beams pointing in the same spatial direction but with different beam widths. During online operation, through 5G NR beam management procedures, the UE needs to identify the best received beam. According to one aspect of the disclosure, the beam may, but need not, correspond to a code-word, such as a code-word from its pre-stored code-book for DL reception. The amplified, phase-corrected signals received on antennas 102*a* through 102*n* may be combined in an analog combiner 108, said combination then being processed by an analog-to-digital converter 110.

The beam shape may be influenced by setting a beam gain, which functionally alters the transmission region of a beam and thus concentrates the transmission power or decibels within the beam. Gain G may be understood as the product of antenna efficiency E and directivity D, such that $G = E_{antenna} \times D$. The efficiency E is determined in relation to the input power $P_{in}$ of the antenna related to the output power $P_0$, such that $P_0 = E_{antenna} \times P_{in}$. The directivity of the antenna refers to the degree of focused output within a three-dimensional space, based on spherical coordinates ($\theta$, $\varphi$), wherein $\theta$ is the altitude and $\varphi$ is the azimuth. The power distribution is shown in the radiation intensity U ($\theta$, $\varphi$). The mean radiation intensity $$\overline{U} = \frac{P_o}{4\pi}.$$

The directivity is given by $$D(\theta, \varphi) = \frac{U(\theta, \varphi)}{\overline{U}}.$$

Gain is then shown by $$G(\theta, \varphi) = \frac{U(\theta, \varphi)}{\frac{P_{in}}{4\pi}}.$$

Figure 1B:
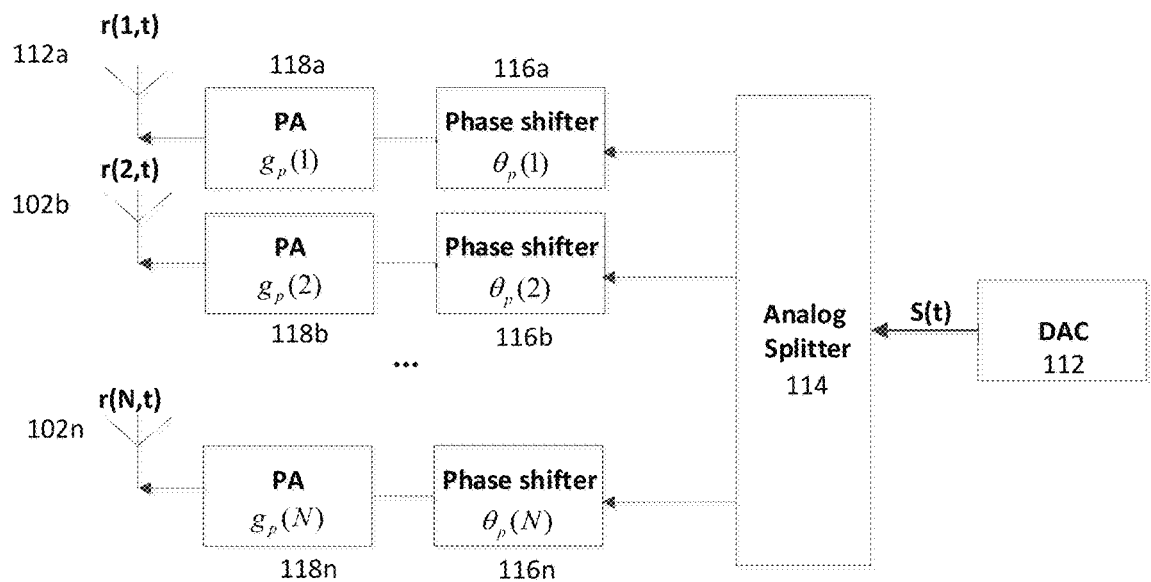
FIG. 1B shows an analog beamforming system for a transmit beam.

FIG. 1B depicts analog beamforming for transmission. In the system model of FIG. 1B, a digital transmission is processed by the Digital-to-Analog converter 112, the results of which are transferred to the Analog Splitter 114, which, in the case of a transmission, splits the transmission signal across a plurality of antennas. The output of the Analog Splitter 114 is sent to a plurality of phase shifters 116*a*, 116*b*, and 116*n*, to shift a signal phase for beamforming, and the phase-shifted signals are sent to the corresponding power amplifiers 118*a*, 118*b*, and 118*n* for signal amplification and transfer to the corresponding antenna 112*a*, 112*b*, to 112*n* for transmission.

Figure 2:
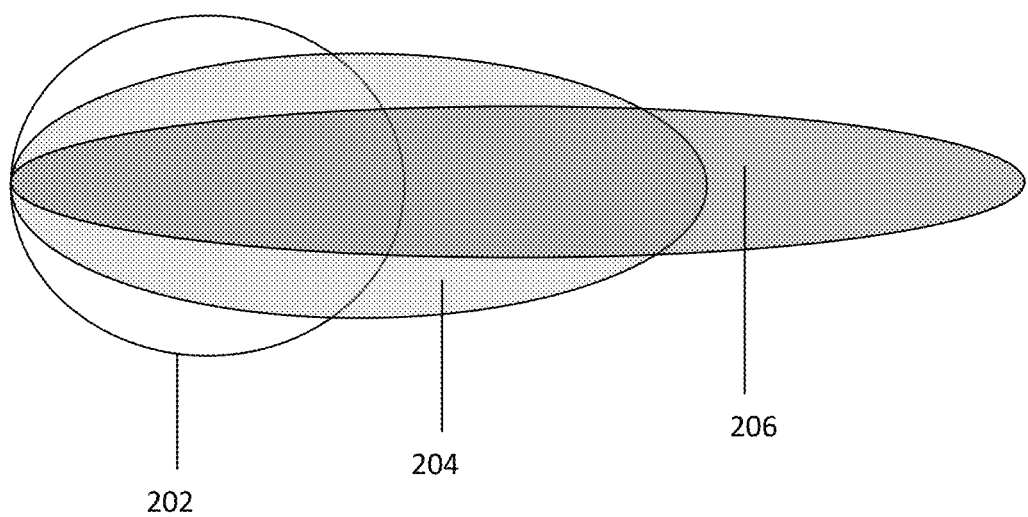
FIG. 2 shows a wireless transmission beam according to a variety of gain settings.

FIG. 2 depicts the influence of beam gain changes in a beam form. Signal 202 is depicted as having a first gain; signal 204 is depicted as having a second gain; and signal 206 is depicted as having a third gain, wherein the third gain is greater than the second gain, which is greater than the first gain. As is demonstrated, a larger gain corresponds to a narrow, more focused beam.

Using beamforming and gain change, a beam management protocol can be performed. A conventional beam management protocol includes a three-phase procedure referred to herein as P1, P2, and P3. In P1, and initial beam acquisition is performed, wherein a base station sweeps through an array of wide beams (low gain beams), which are received by a user device. The user device measures the received signal strength of the array of wide beams, and reports corresponding information to the base station, such that the best wide beam is selected. Also within the P1 step, the user device selects a best wide receive beam to receive the wide transmit beam from the base station. The best wide beam may be a result of the physical relationship between the base station and the user device, such as the altitude and azimuth. The best wide beam may further be influenced by physical objects between the base station and the user device, magnetic fields, interference, or otherwise. At the conclusion of the P1 step, a best wide transmit beam and a best wide receive beam are determined.

Once the best wide transmit beam and the best wide receive beam are determined, the P2 step is carried out, during which the base station sweeps through an array of narrow transmit beams while the user device receives and measures the array of narrow transmit beams with a single fixed wide receive beam. The base station's narrow beams may correspond to a region of the best wide transmit beam, such that the region of the best wide transmit beam is subdivided into a plurality of subregions, each subregion corresponding to a fraction of the area of the wide transmit beam, and corresponding to a width of a narrow transmit beam. The base station determines a best transmit beam based on a user device's report of the layer 1 reference signal received power for each candidate transmit beam. This measurement resource can be based, for example, either on Synchronization Signal Block ("SSB") signals, which are periodically transmitted, or Channel State Information Reference Signals ("CSI-RSs"), which can be scheduled to be periodic, aperiodic, or semi-periodic.

Once a best narrow transmit beam is selected, the base station and the user device proceed with step P3, during which the user device performs receive beam sweeping. The base station fixes its best narrow transmit beam, identified from step P2, and indicates the resource ID associated with the best narrow transmit beam to the user device. The user device sweeps through an array of narrow receive beams and finds the best receive beam based on the user device's internal measurement metrics. These measurement metrics can be based on SSB signals or CSI-RSs. Following the conclusion of step P3, a best narrow transmit beam and a best narrow receive beam have been selected, and the wireless communication may proceed accordingly.

Figure 3:
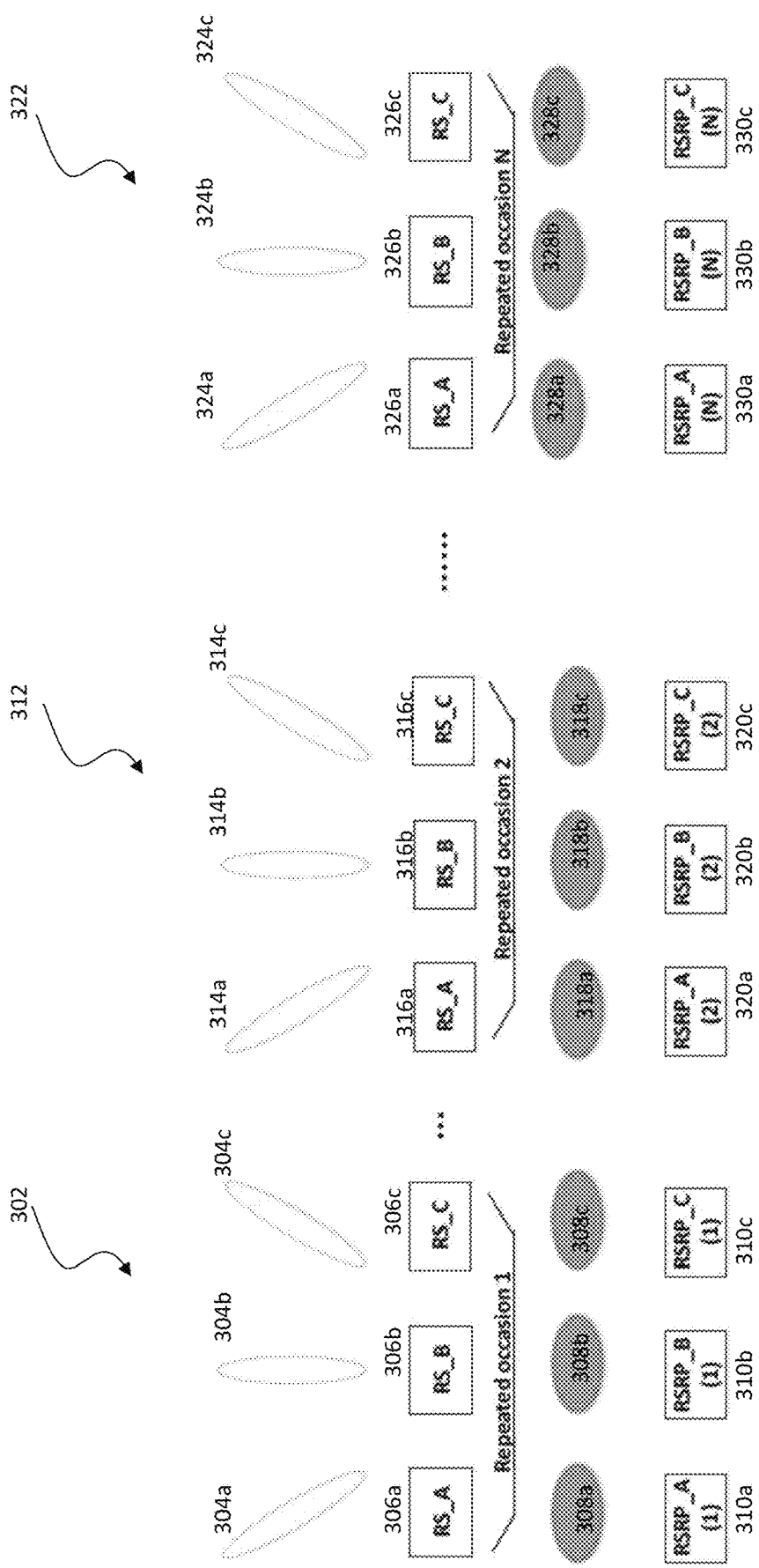
FIG. 3 shows a method of beam selection.

FIG. 3 depicts the P3 phase of the conventional method of beam selection. According to this aspect of the disclosure, the beam measurement resources may be beam measurement reference signals, such as SSB signals or periodic CSI-RSs. Based on RRC signaling, each beam measurement resources identified with a unique ID (such as an SSB ID or a CRI-RS Resource Indicator). The measurement resources are periodically repeated within a measurement reporting interval. As depicted in FIG. 3, there are three periodic beam measurement resources: A, B, and C; however, any number of periodic beam measurement resources may be used, and FIG. 3 is shown with three periodic beam resources to simplify the visual depiction of this process. Each periodic beam measurement resource is associated with a different base station transmission beam. Each measurement resource is repeated for each of a plurality of occasions. The user device measures the resources and reports the measurement results to the base station, such as the best Layer 1 Reference Signal Received Power ("L1-RSRP") and the associated resource ID corresponding to the best base station transmission beam, as measured from the user device's perspective. FIG. 3 depicts a known user device beam management scheduling, wherein the user device uses a constant wide reception beam as a reference user device reception beam while repeatedly measuring the measurement resources. Before reporting the measurements, the user device combines the repeated measurement results for each measurement resource to obtain a more accurate L1-RSRP estimation results. This may be achieved via Infinite Impulse Response ("IIR") filtering or Finite Impulse Response ("FIR") filtering of separated L1-RSRP estimations from repeated measurement resources. The user device selects the strongest estimated L1-RSRP from all measurement resources and reports it, along with its associated resource ID, to the base station. This known method of beam selection may be performed in circumstances where there is a low signal quality and low mobility.

One method of downlink beam management is a multistep method to transition from initial beam acquisition to paired narrow beams between a base station and a user device, which will be referred to herein as the P1/P2/P3 method.

The P1 step of the P1/P2/P3 method comprises an initial beam acquisition, wherein the user device finds a best wide (lower gain) transmit and receive beam pair, which can be achieved, for example, using synchronization signal blocks (SSBs). This procedure is typically performed in idle mode. At the conclusion of this procedure, the user device and base station have typically arrived at a best wide beam pair link, wherein the base station has a best wide transmit beam, and the user device has a best wide receive beam.

FIG. 3 depicts a P2 step of the P1/P2/P3 method. In this step, the base station performs transmit beam sweep with narrow candidate transmit beams while the user device uses a fixed wide (lower gain) receive beam. The base station determines a best transmit beam based on the user device's L1_RSRP measurement reports for each candidate transmit beam. The measurement resource may be based on SSB signals, which are periodically transmitted, or Channel State Information Reference Signals ("CSI-RSs"), which can be scheduled to be periodic, aperiodic, or semi-periodic.

According to FIG. 3, and further with respect to P2, a base station performs transmit beam sweeping to arrive at a best narrow transmit beam. The beam measurement reference signals are beam measurement reference signals such as, but not limited to, SSB signals or periodic CSI-RSs. By using RRC signaling, each beam measurement resource is identified by a unique ID, such as, but not limited to, an SSB ID or CSI-RS Resource Indicator ("CSI"). The measurement resources are periodically repeated within the measurement reporting interval. FIG. 3 depicts three periodic beam measurement resources: RS_A 306a, 316a, and 326a; RSB 306b, 316b, and 326b; and RS_C 306c, 316c, and 326c. The number of the measurement resources depicted herein is selected for convenience purposes, and the number may be smaller or greater, without restriction. Each beam measurement resource is associated with a different base station transmit beam. As depicted in FIG. 3, each measurement resource is repeated N times, resulting in N repeated occasions. The number of repeated occasions depicted in the figures herein is three, comprising a first repeated occasion, a second repeated occasion, and an Nth repeated occasion. The number three is depicted for convenience only, and the number of repeated occasions may be any number, without limitation. This is depicted at least by the ellipsis between the second repeated occasion and the Nth repeated occasion. The user device measures the measurement resources and reports to the base station a best L1-RSRP, as well as the associated resource ID which reflects the best transmission beam from the user device's point of view.

Turning to the details of FIG. 3, a first beam selection Occasion 302 depicts a base station employing an array of, in this case, three narrow (high gain) transmit beams, indicated herein as 304a, 304b, and 304c. Each narrow transmit beam may be received by the user device and measured accordingly, depicted in FIG. 3 as reception A 306a, which corresponds to transmit beam 304a; reception B 306b, which corresponds to transmit beam 304b; and reception C 306c, which corresponds to transmit beam 304c. Each transmit beam is received using a receive beam beamforming setting. According to this beam selection protocol, the user device may use a single receive beamforming setting for each narrow transmit beam, and for each repeated Occasion of transmit beams, as depicted herein. With respect to Occasion One, the user device maintains a uniform receive beamforming setting for each transmit beam, such that receive beam 308a corresponds to transmit beam 304a; receive beam 308b corresponds to transmit beam 304b; and receive beam 308c corresponds to transmit beam 304c.

The transmission of the array of transmit beams comprises a first Occasion of transmit beams. The Occasion of transmit beams may be repeated any number of times. A repeated Occasion of transmit beams permits the user device to re-measure transmit beam signals and to create an average measurement of transmit beam signals for transmission to the base station. FIG. 3 depicts at least three occasions of transmit beam transmissions, Occasion A, Occasion B, and up to Occasion N. Each Occasion comprises a repeated array of transmit beams and receive beams. As depicted in FIG. 3, Occasion B comprises transmit beams 314a, 314b, and 314c, which are received in reception 316a, 316b, and 316c, respectively, using receive beams 318a, 318b, and 318c, respectively. Occasion N comprises transmit beams 324a, 324b, and 324c, which are received in reception 326a, 326b, and 326c, respectively, using receive beams 328a, 328b, and 328c, respectively. The user device measures a signal quality of the received transmit beams, wherein a measurement is generally performed for each of the received transmit beams, as depicted by 310a, 310b, and 310c, with respect to Occasion A, 320a, 320b, and 320c, with respect to Occasion B, and 330a, 330b, and 330c, with respect to Occasion N. The user device prepares a report of the measured signal qualities for transmission to the base station. The report may include one or more measurements for each beam of each repeated Occasion, or the report may include an average of measurements corresponding to a single transmit beam, transmitted over a plurality of Occasions. By transmitting an average measurement, rather than a plurality of individual measurements, short-lived phenomena, which may impair or disturb reception can be accounted for. In preparing the report, the user device may engage in a postprocessing procedure, whereby the repeated measurement results for each measurement resource are combined to obtain a more accurate L1-RSRP results. According to one aspect of the disclosure, the repeated measurement results may be gained from IIR filters or FIR filters. The user device may select the strongest estimated L1-RSRP from the measurement resources and report this result associated with its resource ID to the base station through uplink channels.

Figure 4:
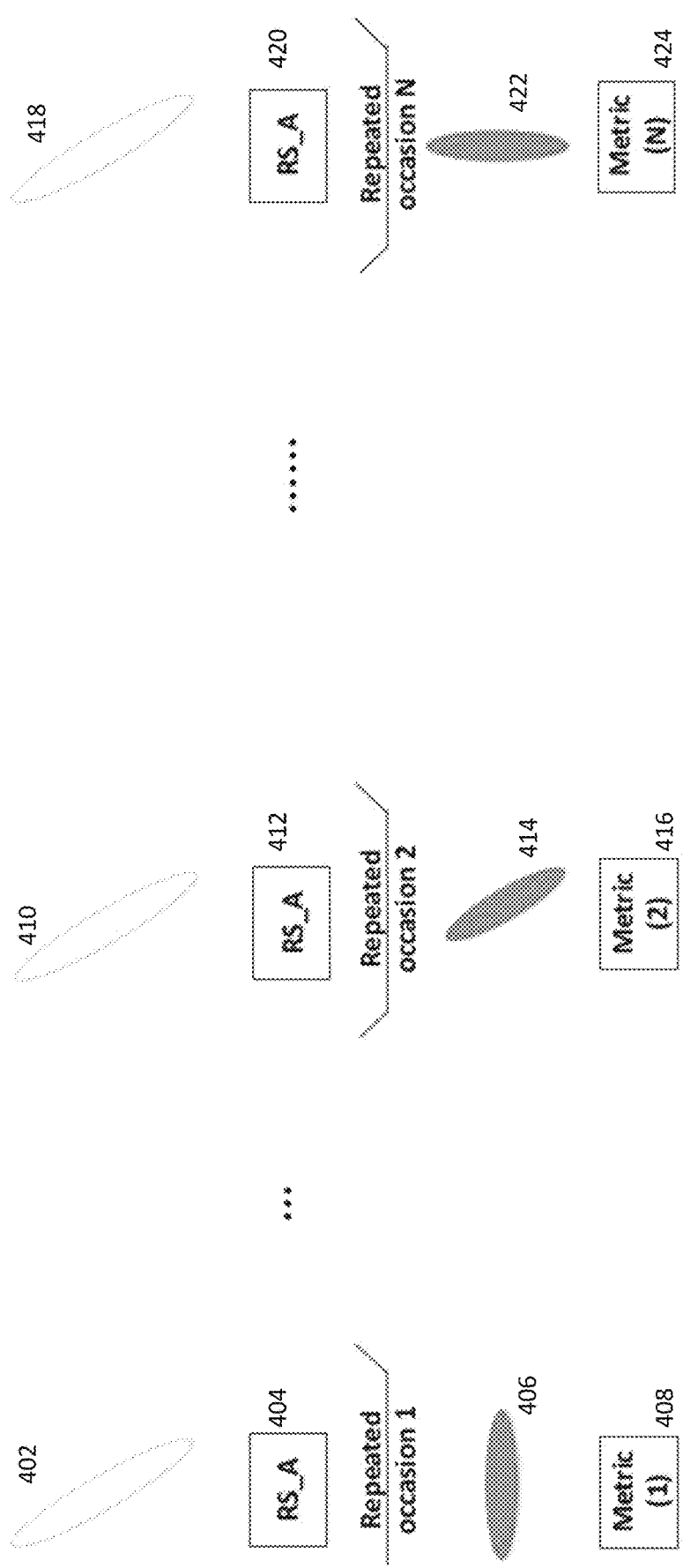
FIG. 4 shows a P3 step of beam selection.

FIG. 4 depicts a P3 step of the P1/P2/P3 method, which is performed subsequent to the P2 beam selection procedure depicted in FIG. 3. Based on the user device measurement report in P2, the base station fixes the measurement resource associated with the best transmit beam. The user device then initiates a receive beam sweep in procedure on the selected resource. In the P3 procedure, the user device measurement is not restricted to L1-RSRP, but can be based on additional and/or alternative metrics, because the user device need not report the measurement results to the base station for this phase.

Turning to FIG. 4, after the user device transmits its report of measured signal qualities to the base station, the base station may determine a best narrow (high gain) transmit beam. Thereafter, the base station transmits a plurality of iterations of the selected narrow transmit beam as depicted by 402, 410, and 418. During each of these iterations, the user device receives the narrow transmit beam as shown by 404, 412, and 420, respectively. During these iterations, the user device may be configured to implement a plurality of narrow (high gain) receive beams, as depicted in 406, 414, and 422. The narrow receive beams may be configured in different directions. The narrow receive beams may be selected such that at least one narrow receive beam at a first direction corresponds with a first narrow transmit beam, and at least one narrow receive beam at a second direction corresponds with a second narrow transmit beam, as depicted in 406 and 414, respectively. Because the narrow transmit beams at this stage are expected to be substantially identical, the user device may measure a signal quality of the repeated transmit beams using a plurality of different narrow receive beams. Following the cycle of received transmit beams, the user device may determine a best receive beam by measuring a signal quality of the received beams as depicted in metrics 1,2 and N, 408, 416, and 424 respectively. Upon determining a best narrow receive beam, the user device may employ the best narrow receive beam to receive future transmissions from the base station.

The P2 base station transmit beam sweeping procedures and the P3 user device receive beam sweeping procedures are time-multiplexed. That is, determination of an optimal beam pair requires iterative execution of P2 and P3, which may be time-consuming. In high mobility scenarios, a standard formulation of the P1/P2/P3, method may be insufficiently rapid to track user device receive beam changes.

In the P2 procedure, and in order to achieve periodic beam measurements, the user device may be called upon to repeatedly measure a large number of base station transmit beam candidates. Under some current Random Access Network agreements, as many as sixty-four beam management resources may be attempted per component carrier. Such measurements may require significant modem power consumption. In addition, this may introduce an unbalanced processing load in the user device, as the P2 processing results in a higher computational load than the P3 processing. The unbalanced load processing may create difficulties in user device L1 digital signal processor task scheduling, particularly in circumstances where a software defined radio based modem has shared hardware.

Figure 5:
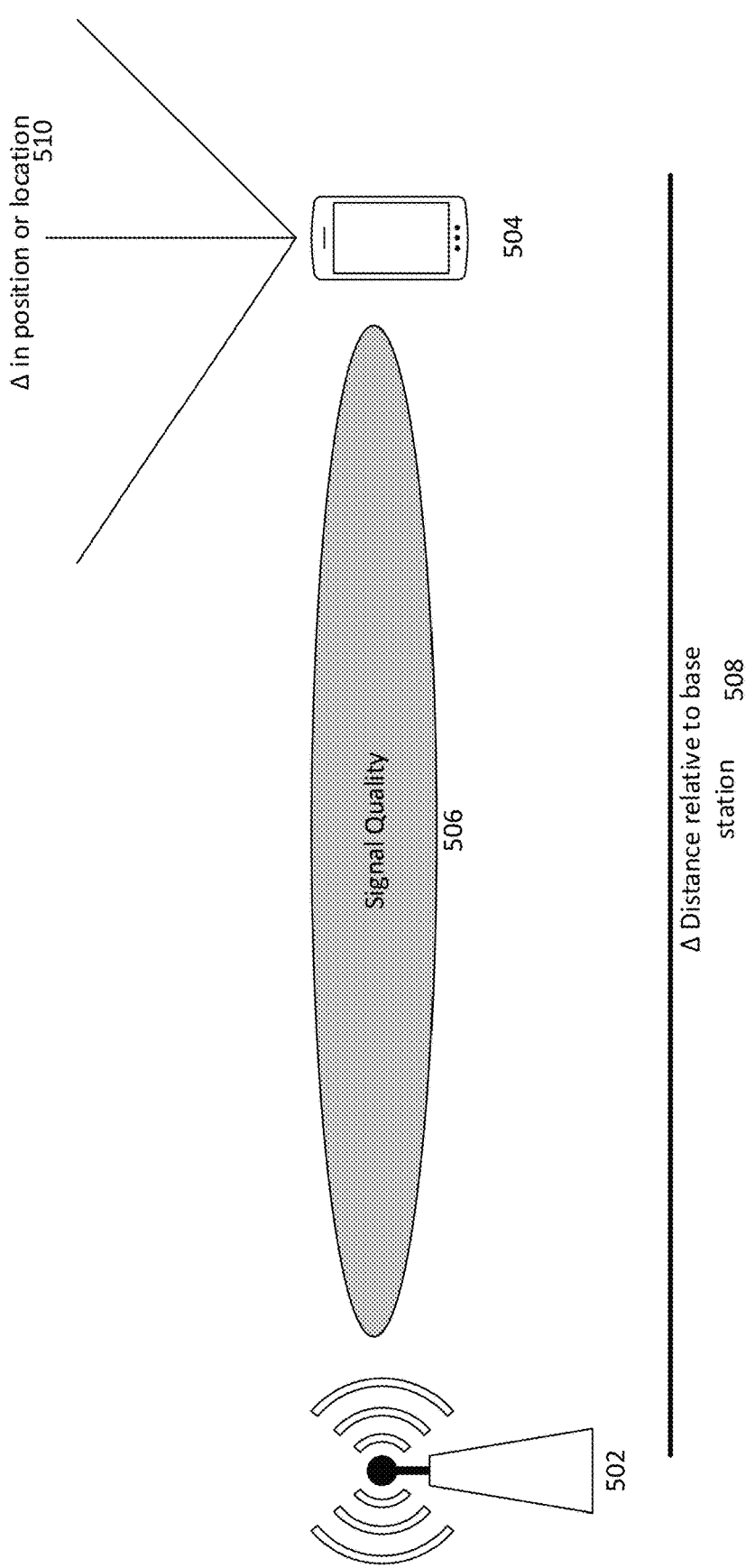
FIG. 5 shows a signal factor and mobility as an element of beam selection.

FIG. 5 depicts a signal measurement and mobility measurement, according to one aspect of the disclosure. Although a base station 502 may communicate with a plurality of user devices concurrently, the signal measurement and mobility measurement is depicted herein, for simplicity, between a single base station in a single user device 504. In this case, the base station 502 transmits a wireless communication via a beam according to a beamforming setting 506 to the user device 504. Upon receiving the wireless transmission, the user device 504 measures a signal quality of the wireless transmission. According to one aspect of the disclosure, the signal quality may be a signal to noise ratio, although any other measurement may be used to discern a quality of the received wireless transmission by the user device. In addition, the user device 504 may measure a mobility of the user device 504. The mobility may be, for example, a change in distance relative to the base station 508, or a change in absolute position or location 510, such as measured using a global positioning system. The user device may be configured to compare the measured signal quality and measured mobility to one or more predetermined thresholds, such as to determine a high or low signal quality, and/or to determine a high or low mobility. According to another aspect of the disclosure, a plurality of thresholds may be available for at least one of signal quality or mobility, such that the wireless device may be configured to categorize at least one of signal quality and mobility into three or more levels.

FIGS. 6-9 depict four beam selection protocols, which may be used in lieu of the beam selection protocol described above with respect to FIG. 3.

As a general matter, in order to enable the scenario adaptive beam management policy selection described herein, the wide beam pair (wide transmit beam and wide receive beam) must have been selected, which allows the user device and base station to begin selecting narrow beams in the method subsequently described. This adaptive beam management selection scheme begins after a pair of transmit and receive wide beams are identified, and this scheme is characterised at least by the base station sweeping its narrow transmit beams which that each transmit beam is associated with a different reference resource ID. For example, in FIG. 6, if the reference resources are SSBs, then different SSB indexes are always associated with different transmit beams. Thus, the user device can generally perform adaptive beam management policy selection for SSB based beam management.

If the reference resources are CSI-RS, there is a repetition flag associated with a set of CSI-RS resources (CSI-RS resource set). When that flag is set by a high layer signalling to be "OFF", it implies that the beam selection scheme has begun because different CSI-RS resource indexes will be associated with different base station transmit beams.

Figure 6:
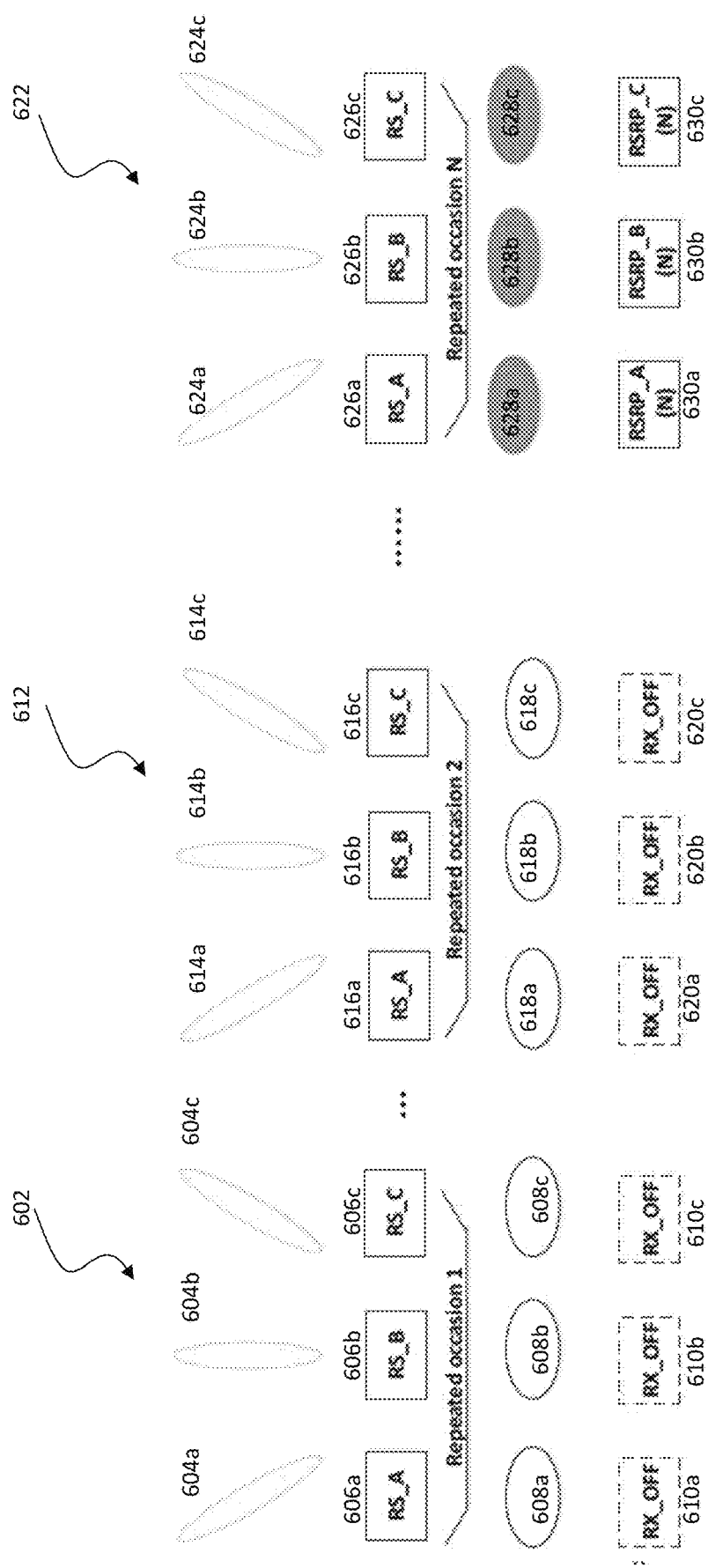
FIG. 6 shows a P2 method of beam selection according to a first aspect of the Disclosure.

FIG. 6 depicts a first beam selection protocol according to a first aspect of the disclosure. The beam selection protocol described herein may be implemented, for example, in situations of high signal quality and low mobility. This may include situations in which the user device is stationary or in limited motion and the wireless channel condition is good. The user device's receiver may be switched off during transmission of other repeated measurement resource occasions within the same reporting interval, in order to reduce user device power consumption. According to one aspect of the disclosure, the first beam selection protocol identified in FIG. 6 may replace the P2 step of the P1/P2/P3 method described above.

According to this first beam selection protocol in FIG. 6, the user device may only measure the final repeated Occasion of measurement resources before reporting. That is, throughout each of the transmission Occasions from the first Occasion until, but not including, the Nth Occasion, the user device does not measure a signal quality of the received transmit beams. This may be performed by any known means including, but not limited to, turning off the receiver for a period of time corresponding to the repeated Occasions. On the final Occasion (the Nth Occasion), the user device measures the received transmit beams and reports a signal quality corresponding to the transmit beams to the base station.

In more detail with respect to FIG. 6, a first repeated Occasion 602 and a second repeated Occasion 612 are depicted, leading to a final repeated Occasion 622 (notated as the Nth Occasion). Each of the Occasions contain an identical array of narrow (high gain) transmit beams, as depicted herein as 604a, 604b, and 604c with respect to repeated Occasion One 602; 614a, 614b, and 614c, with respect to repeated Occasion Two 612; and 624a, 624b, and 624c, with respect to repeated Occasion N 622. The user device does not measure the transmit beams from the repeated Occasions, except for the final occasion, as depicted by the clear receive segments 608a, 608b, 608c, and 618a, 618b, 618c. The user device begins measurement of the received signal quality for the repeated Occasion N, as depicted by shaded receive segments 628a, 628b, and 628c. Upon measuring the receive signal quality for 628a, 628b, and 628c, the user device transmits the measured signal quality for each measured, received transit beam, as depicted in 630a, 630b, and 630c. Based on the received signal qualities, the base station will determine a preferred narrow transmit beam. This differs from the protocol depicted in FIG. 3 at least by the user device being configured not to receive at least one repeated Occasion of transmit beams. The user device may be configured to receive only one repeated Occasion of transmit beams. By receiving a limited number of repeated Occasions, the user device preserves battery resources. Although receipt of only a single repeated Occasion precludes multiple estimates of a single received transmit beam, and therefore precludes transmission to the base station of in averaged received signal quality for a given narrow transmit beam, this procedure may be desirable at least in light of the potential for preservation of battery resources. This method may be made possible by the high signal quality, such as a high signal-to-noise ratio, and the low mobility, which implies a stability the use of a selected transmit beam and/or receive beam. Within the standard beam management framework, most beam management reference signals that are chosen as measurement resources, such as SSB or Broadcast Multicast ("BM") CSI-RS symbols, are time domain multiplexed with other channels. In such cases, the user device receiver can be switched off within the beam management reference symbol durations to achieve an aggressive power reduction. In some circumstances, a base station may schedule frequency domain multiplexed channels with the management reference signals. In such cases, the user device may adjust the receive beam direction to other channels of interest and omit baseband measurement processing for repeated beam management reference signals, which will result in decreased power consumption.

Although the method describe with respect to FIG. 6 had depicted the user device switching off its reception for all but the last repeated occasion, such that only the last occasion is listened to, this procedure can alternatively be performed to listen to any other occasion. That is, any one occasion, whether the first occasion, the last occasion, or another occasion, may be selected as an occasion to listen to, while the user device's receiver remains switched off for the remaining occasions. Alternatively, the user device's receiver may be switched off for any one or more occasions such that fewer than all of the repeated occasions are listened to.

Figure 7:
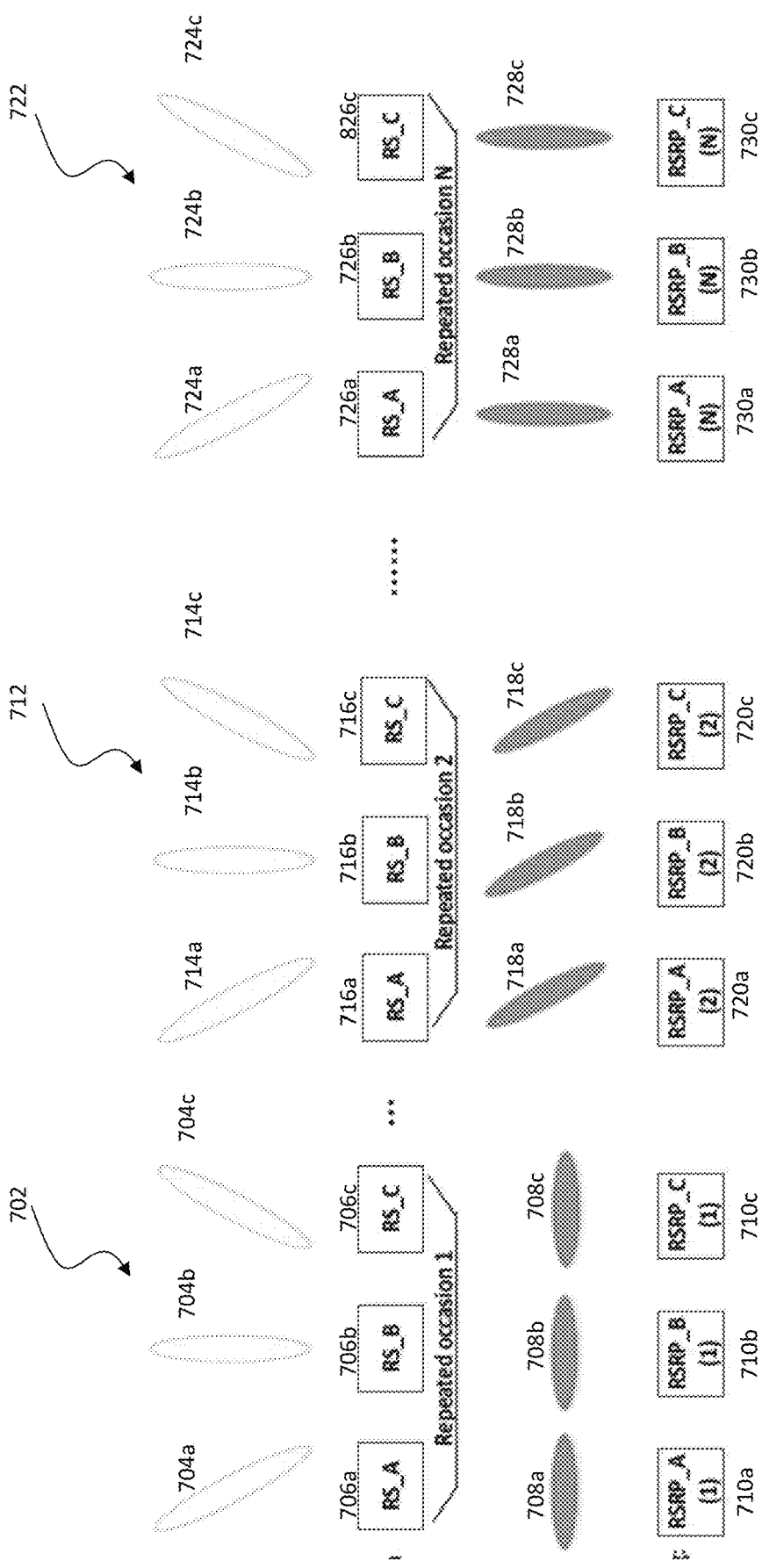
FIG. 7 shows a P2 method of beam selection according to a second aspect of the Disclosure.

FIG. 7 shows a beam selection procedure according to a second aspect of the disclosure. This beam selection procedure according to the second aspect may be desirable for situations of high signal quality and high mobility. According to this aspect, the user device will alternate a narrow receive beam for each repeated resource Occasion within the measurement interval, which may permit rapid tracking of a user device receive beam change due to high mobility. In the subsequent phase corresponding to P3, the user device will have already identified a best receive beam and can immediately apply the receive beam after the base station fixes the transmit beam. As such, RSRP combining is not feasible, as the transmit/receive beam pair is not the same for repeated measurement instances. Nevertheless, the accuracy of the individual measurements is sufficient in light of the high signal quality.

During postprocessing, the user device may select a measurement instance with a strongest RSRP within the reporting interval, and report this selected measurement instance together with the associated resource ID to the base station.

As shown in FIG. 7, the base station performs a plurality of repeated beam selection Occasions, as depicted in repeated Occasion One 702, repeated Occasion Two 712, and completing with repeated Occasion N 722. During each repeated occasion, the base station transmits according to an array of narrow (high gain) beamforming settings, which are repeated in each repeated occasion. This is depicted in a first array of narrow beamforming settings in repeated Occasion One 702, as shown by first beamforming setting 704a, second beamforming setting 704b, and third beamforming setting 704c; the second array of narrow beamforming settings in repeated Occasion Two 712, as shown by first beamforming setting 714a, second beamforming setting 714b, and third beamforming setting 714c; and the final array of narrow beamforming settings in repeated Occasion N 722, as shown by first beamforming setting 724a, second beamforming setting 724b, and third beamforming setting 724c. In contrast to the method shown in FIG. 6, above, the user device may be configured to receive the transmit beams in each of the repeated Occasions. During each repeated Occasion, the user device may be configured to receive the base station's transmit beams according to a different receive beam setting, such that the user device uses a first receive beam setting for repeated Occasion One, a second receive beam setting for repeated Occasion Two, and a final receive beam setting for repeated Occasion N. This is depicted in FIG. 7 as a first receive beam setting (see receive beams 708a, 708b, and 708c) for repeated Occasion One 702, second receive beam setting (see receive beams 718a, 718b, and 718c) for repeated Occasion two 712, and a third receive beam setting (see receive beams 728a, 728b, 728c)

for repeated Occasion N 722. Regarding postprocessing, the user device selects a measurement instance with the strongest signal quality estimated within the reporting interval, and it reports this selected measurement instance together with an associated resource ID to the base station. According to this aspect of the disclosure, the user device must also store the receive beam configuration associated with the best signal quality measurement instances and an associated resource ID. In a subsequent P3 phase, if the base station fixes its transmission beam associated with the same resource ID, then the user device retrieves the associated user device receive beam configuration and applies this receive beam setting. The user device receives and measures each received transmit beam from the base station for each repeated Occasion, as indicated by receipt and measurement blocks 710a, 710b, and 710c for repeated Occasion One 702, receipt and measurement blocks 720a, 720b, and 720c for repeated Occasion two 712, and receipt and measurement blocks 730a, 730b, and 730c for repeated Occasion N 722.

Figure 8:
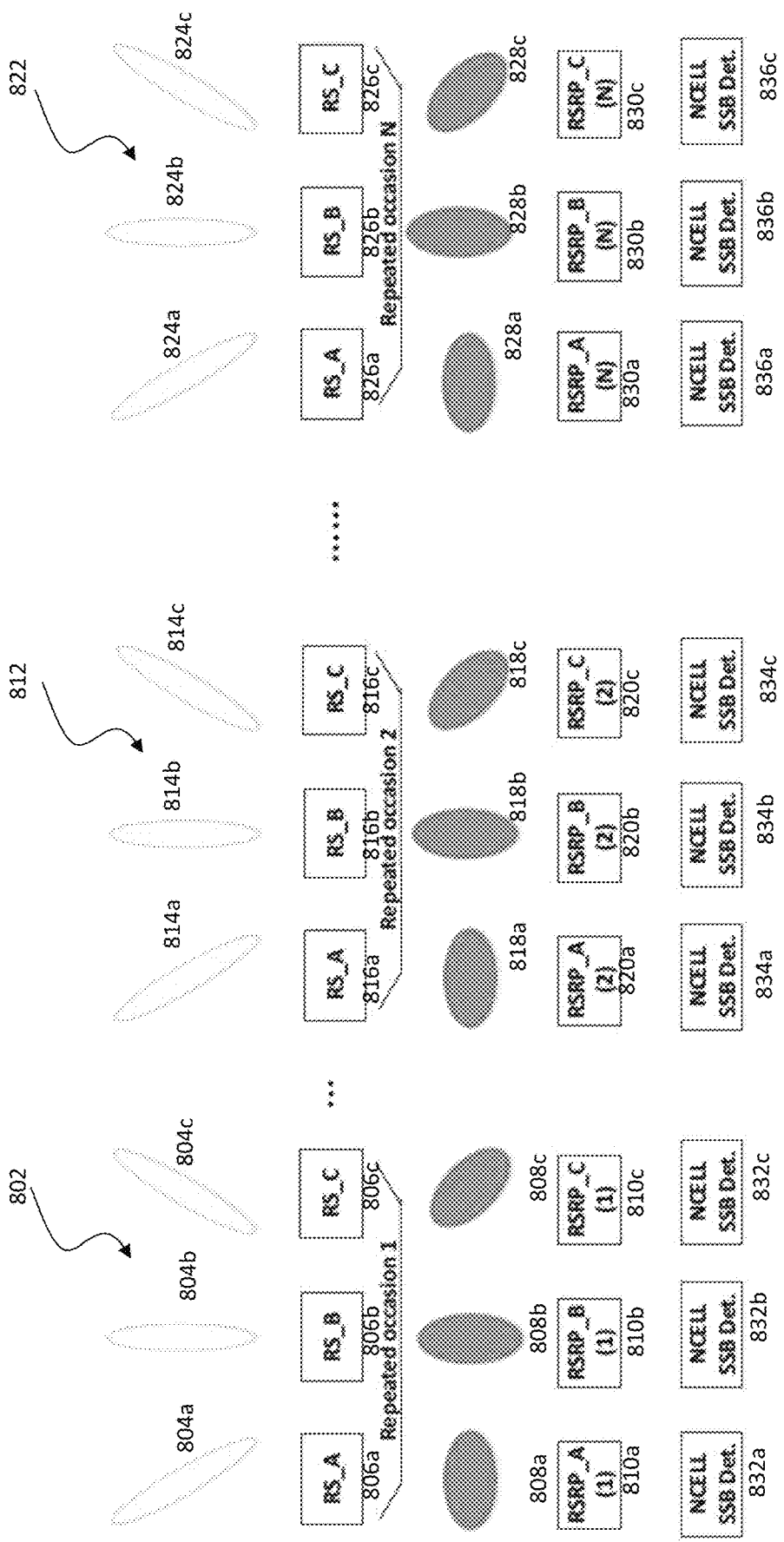
FIG. 8 shows a P2 method of beam selection according to a third aspect of the Disclosure.

FIG. 8 shows a beam selection procedure according to a third aspect of the disclosure. This beam selection procedure according to the third aspect may be desirable for situations of low signal quality and high mobility. According to this third aspect, the user device may alternate wide receive beams in measurement resources within a single repeated occasion; however, the user device may be configured to utilize the same receive beam for different repeated occasions of the same measurement resource. Moreover, the user device may be configured to activate neighbor cell detection for each wide receive beam direction. As depicted, the user device may encounter a plurality of repeated Occasions, as shown by repeated Occasion One 802, repeated Occasion Two 812, and repeated Occasion N 822. During each repeated occasion, the base station transmits a plurality of narrow (high gain) transmit beams focused in different directions according to various beamforming settings. This is seen in the three narrow transmit beams 804a, 804b, and 804c in repeated Occasion One 802, narrow transmit beams 814a, 814b, and 814c in repeated Occasion Two 812, and narrow transmit beams 824a, 824b, and 824c in repeated Occasion N 822. During each repeated occasion, the user device employs a plurality of wide (lower gain) receive beams as depicted in receive beams 808a, 808b, and 808c for repeated Occasion One 802, receive beams 818a, 818b, and 818c for repeated Occasion Two 812, and receive beams 828a, 828b, and 828c for repeated Occasion N 822. As depicted herein, a wide receive beam in a first direction corresponds to a narrow transmit beam in a first direction within each of the repeated occasions. Otherwise stated, each wide receive beam corresponds to a narrow transmit beam, and this same wide receive beam and narrow transmit beam association is maintained throughout each of the repeated occasions. According to this aspect, the signal quality of the various transmit beams is still measured and reported to the base station for selection of a preferred transmit beam, as depicted in 810a, 810b, and 810c with respect to repeated Occasion One 802, 820a, 820b, and 820c with respect to repeated Occasion Two 812, and 830a, 830b, and 830c with respect to repeated Occasion N 822. Meanwhile, for each wide receive beam, the user device further activates neighbor cell detection. The activation of neighbor cell detection with varying directions of wide receive beams allows for detection of neighboring cells in different directions. By detecting neighboring cells, said neighboring cells can be reported to the base station, such that the user device is timely prepared for handover.

Figure 9:
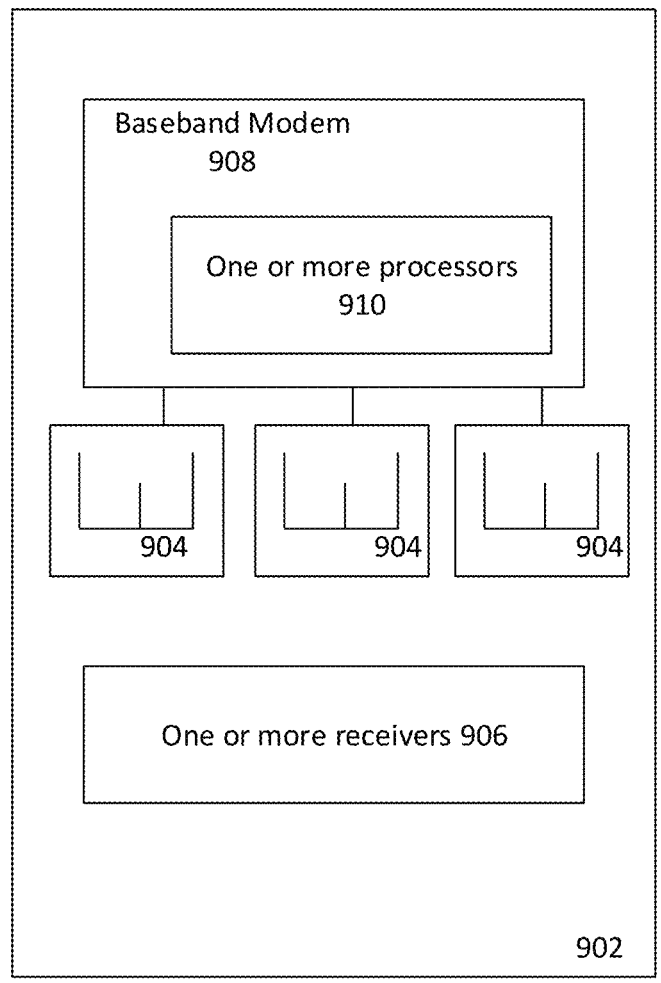
FIG. 9 shows a wireless communication device.

FIG. 9 depicts a wireless communication device 902 according to one aspect of the disclosure, the wireless communication device 902 comprising a plurality of antennas 904, configured to receive a wireless signal; one or more receivers 906, configured to detect position data indicating a position of the wireless communication device and to process the wireless signal for one or more processors 910; the one or more processors 910, configured to determine a signal quality of the wireless signal; determine a position change information of a position of the wireless communication device based on the detected position data; and select a beam selection protocol from a plurality of beam selection protocols based on at least the signal quality and the position change information. According to one aspect of the disclosure, the wireless communication device 902 may further comprise a baseband modem 908, configured to modulate and demodulate a signal for wireless communication. According to another aspect of the disclosure, the one or more processors 910 may be baseband modem 908 processors.

Figure 10:
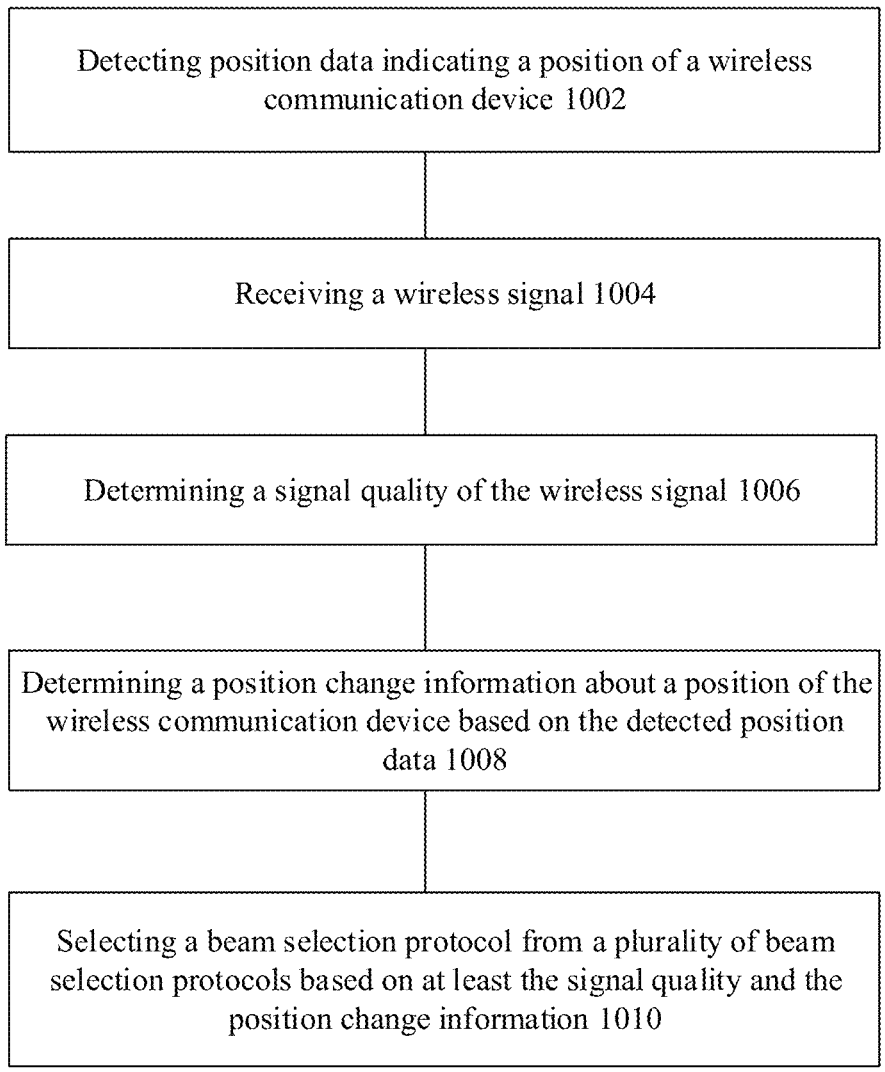
FIG. 10 shows a method for beam selection.

FIG. 10 depicts a method of beam selection according to one aspect of the disclosure comprising detecting position data indicating a position of a wireless communication device 1002; receiving a wireless signal 1004; determining a signal quality of the wireless signal 1006; determining a position change information of a position of the wireless communication device based on the detected position data 1008; and selecting a beam selection protocol from a plurality of beam selection protocols based on at least the signal quality and the position change information 1010.

Base stations employ transmit beams to send information to mobile devices. Base stations may be capable of one or more beamforming operations to control a transmit beam to be primarily directed in a general direction, which may be useful in improving communication with a mobile device. Moreover, base stations may also be capable of altering a gain of the transmit beam, thereby determining a width or narrowness of the transmit beam.

Given the broad ability to direct and shape the base station's transmit beams, it is useful to employ a beam selection protocol, which aids the base station and mobile device in selecting an suitable beam configuration. In general, a plurality of iterative beam sweeping techniques are used for this purpose. Often, the base station first employs a low gain transmission beam, and the low gain beam is directed in a series of headings to cause the beam to sweep across a beam selection region. A mobile device measures the received transmit beams and reports to the base station a preferred beam base, for example, on a best receive signal strength or signal to noise ratio. Upon receiving this preferred beam, the base station will increase the beam gain to create a narrower transmit beam, and the base station will perform an additional sweep using the higher-gain beam. Often the base station will send the higher-gain beam generally within a region corresponding to the lower-gain beam. That is, the base station will send the higher-gain beam with a sector that corresponds to the coverage of the preferred low-gain beam. The mobile device measures the received higher-gain transmit beams and reports to the base station a preferred beam, such as based on the best receive signal strength or signal to noise ratio. By using an iterative, multi-step process, a suitable transmit beam can often be selected.

In addition to beamforming of transmit beams, such as by a base station, a user device may be capable of receive beamforming. Unlike transmit beamforming, which alters a projection of a wireless signal, receive beamforming involves combining received information from various sensors such that a particular pattern is preferentially observed. With respect to a user device, the user device may be equipped with multiple antennas, and the receive signal from a plurality of antennas may be amplified by different weights or weighting patterns. By using this method, a functional main lobe within the receive area can be formed. Various receive beamforming techniques are known in the art, and the procedures described herein may be performed with any known receive beamforming technique.

As downlink beam management becomes more commonplace, it will be necessary to create strategies to manage beam selection. For example, downlink beam management has been introduced into 5G New Radio millimeter wave communications and will require efficient strategies for managing beam selection. From a downlink perspective, the aim is to find a best beam pair link between the base station transmit antennas and the user device receive antennas.

The methods described herein may be organized, for example, into four beam management protocols for a user device to respond to periodic base station transmit beam sweep in in the P2 phase. The protocols may be selected according to the results of a signal quality measurement and a mobility measurement. For example, the first protocol, as depicted in FIG. 6, may be selected where the signal quality is high but the mobility is low. The second protocol as depicted in FIG. 7 may be selected when both the signal quality and the mobility are high. The third protocol, as depicted in FIG. 9, may be selected when the signal quality is low and mobility is high.

In instances when both the signal quality and mobility are low, it may be recommended to utilize the conventional P2 procedure, as depicted in FIGS. 3 and 4. By using the conventional method, accurate L1-RSRP can be estimated after combining multiple measurement instances in a low signal quality situation. This may be achieved via, for example, IIR filtering or FIR filtering. L1-RSRP filtering may only be possible when the base station transmit beam and the user device receive beam are constant during the measurement instances.

According to another aspect of the disclosure, the user device may be configured to adaptively switch between the proposed beam selection protocols based on infield channel observations. Such observations may be based on internal user device channel parameter estimation results by exploiting the Demodulation Reference Signals ("DMRS") or Phase Tracking Reference Signals ("PTRS"), which may be quasi co-located with beam management resources based on historical quality measurement of the management resources, or based on external sensor inputs. The transition between protocols may be a hard transition or soft transition, meaning that the transition may include ceasing one protocol and beginning another, or may incorporate aspects of two or more protocols into a single protocol.

According to another aspect of the disclosure, beam selection may incorporate dynamic protocol switching based on user device scenario detection. That is, dynamic switching among the four proposed beam management protocols is further proposed within the user device L1 controller. This may be based on runtime scenario detection within the user device. The scenario detection may be based on at least one of the following approaches; a first scenario detection approach may be based on runtime channel parameter estimation results, which may be a side product for the user device downlink demodulation, such as signal-to-noise ratio, Doppler shift, Doppler spread estimation from Demodulation Reference Signals or Phase Tracking Reference Signals associated with Physical Broadcast Channel ("PBCH"), Physical Downlink Control Channel ("PDCCH"), or Physical Downlink Shared Channel ("PDSCH").

Scenario detection may be based on parameter prediction from historical measurement of the same beam management resources. That is, the user device may be equipped with a memory, configured to store historical beam management measurements. In performing one or more beam management measurements, the user device may be configured to compare the beam management measurements with historical beam management measurements, and derive from the comparison a corresponding the management protocol.

Scenario detection may be based on sensing information gathered from external sensors. This may include, for example, a motion sensor, configured to detect a rotation of a user device; a global navigation satellite system sensor, configured to detect a location difference with respect to a serving base station, or any other location service to measure a location of the user device relative to the base station. According to one aspect of the disclosure, a location of the user device relative to the base station may imply a signal quality and may be used as a basis to evaluate the signal quality.

As stated above, the user device may be configured to soft switch between beam management protocols. For example, in FIG. 6, instead of the user device measuring only one measurement, the user device may be configured to measure a subset of multiple repeated occasions, and to combine these multiple measurement results into its reporting. As a corollary, the user device may switch off its receiver or baseband measurement processing for the remaining repeated occasions. The number of measured occasions may be increased or decreased based on, for example, a detected signal quality. Such a system permits a smooth transition between, for example, beam management protocol one related to high signal quality and low mobility, and beam management protocol two related to a low signal quality and low mobility.

An additional method of soft switching between beam management protocols includes the user device sweeping a different narrow receive beam for a subset of multiple repeated occasions rather than sweeping a different narrow receive beam for each repeated occasion. This method provides a soft transition between the beam management protocol for a higher a signal quality and high mobility and the beam management protocol for low signal quality and low mobility.

According to one aspect of the disclosure, the beam management protocols described herein may be conducted by one or more processors located within a baseband modem of the user device. Although a user device may be equipped with one or more processing units external to the baseband modem, the baseband modem may be equipped with one or more processors to carry out modem-related functions, which may take place independently of any central processing processors. The one or more processors of the baseband modem may be configured to carry out the procedures described herein. This may occur with or without the knowledge of any other processors external to the baseband modem.

According to another aspect of the disclosure, the beam management protocols described herein may be conducted by one or more processors external to the baseband modem. That is, one or more central processors may instruct the baseband modem to carry out the beam management protocols described herein.

According to an aspect of the disclosure, the signal quality described herein may be signal-to-noise ratio. The signal quality may reflect a level of the desired signal, such as the signal transmitted by the base station, to a level of noise. The signal-to-noise ratio may be measured according to any known method of signal-to-noise ratio measurement, without limitation. The signal quality may be measured by any circuit within the user device based on received transmissions from the user device's antennas.

The mobility level of the user device may be determined from sensor data such as any of Global Navigation Satellite System Data, Local Positioning System Data, Real-Time Locating System Data, Mobile Phone Tracking Data, angular rotation sensor data, rotary position sensor data, gyroscope data, or any combination thereof. According to one aspect of the disclosure, the mobility levels described herein may relate to a change in location of the user device relative to the base station. The mobility levels may alternatively or additionally be determined from an absolute change in location of the user device, irrespective of a position of the base station. Alternatively or additionally, the mobility levels of the user device may be determined based on a change in orientation of the user device, such as a movement of the user device with respect to role, yaw, or pitch, even in circumstances where the user device does not change location according to an x-, y-, or z-axis. As referred to herein, the "mobility" may be synonymous with a "position factor."

The user device may be configured to compare the signal quality and mobility to one or more predetermined thresholds. With respect to signal quality, the user device may be configured to measure the signal quality and to compare the measured signal quality with a predetermined threshold, such that the measured signal quality is likely above or below the predetermined threshold. The predetermined threshold may correspond to a line of demarcation between a high signal quality at a low signal quality. Similarly, the user device may be configured to compare the user device mobility with a predetermined threshold, selected to demarcate between high mobility and low mobility. In so comparing the signal quality and mobility with predetermined thresholds, the user device may assess the signal quality and mobility as being "high" or "low", and therefore select a suitable beam management protocol.

According to another aspect of the disclosure, the user device may compare the measured signal quality and/or mobility with a plurality of predetermined thresholds. The plurality of predetermined threshold may be selected to create one or more transitional steps between high signal quality and low signal quality, or one or more transitional steps between high mobility and low mobility. Upon determining that signal quality and/or mobility falls within the one or more transitional steps between high and low, the user device may be configured to combine or blend two or more of the beam management protocols.

According to another aspect of the disclosure, the user device may be configured to select a beam management protocol based on signal quality, mobility, and at least one additional factor. The one additional factor may include at least one of run-time channel parameter estimation results; a previous beam selection protocol selection; data from one or more external sensors; or any combination thereof. Said run-time channel parameter estimation results may include at least one of signal to noise ratio; Doppler shift; Doppler spread estimation from demodulation reference signal to phase-tracking reference signal associated with physical broadcast channel, synchronization signals, channel state information reference signals (CSI-RS), tracking reference signals, or phase-tracking reference signals; physical downlink control channel; physical downlink shared channel; or any combination thereof.

According to another aspect of the disclosure, the wireless communication device may be equipped with one or more processors configured to perform a machine learning function. The machine learning function may utilize historical beam selection data for a current or future beam selection. According to this model, beam selection protocols may be stored in a memory. The stored beam selection protocols may be stored with corresponding data, such as signal quality data and/or mobility data. In performing a machine learning function, one or more calculations may be performed, using the stored data, to predict a suitable beam selection protocol. This predicted data may be used in isolation to select a beam selection protocol, or it may be used in combination with current signal quality and/or mobility information. For example, such historical data, or a predicted beam selection protocol arising therefrom, may be used to assign a weight or significance to current signal quality and/or mobility data.

To perform the beam selection procedures described herein, at least two antennas are necessary in the user device to form a suitable receive beam. The at least two antennas can be at least two separate antennas or multiple antenna elements within an antenna array, while the receive signals from all antenna elements are combined and fed into to a single analog-digital-converter; they can also be multiple receive antenna ports while the receive signals from receive antenna port is fed into a separated ADC.

According to one aspect of the disclosure, a metric for the detected signal quality metric can at least include one of signal to noise ratio, Channel Quality Indicator estimation, and rank indicator estimation. Where rank indicator estimation is selected as the signal quality metric, at least two transmit antenna ports may be necessary for transmission of the reference resource, and at least two receive antenna ports may be necessary for receiving the reference resource.

According to another aspect of the Disclosure, the elements disclosed herein may be carried out in accordance with any of the following Examples.

In Example 1, a wireless communication device is disclosed comprising two or more antennas, configured to receive a wireless signal; one or more receivers, configured to detect position data indicating a position of the wireless communication device and to process the wireless signal for one or more processors; the one or more processors, configured to determine a signal quality of the wireless signal; determine a position change information of a position of the wireless communication device based on the detected position data; and select a beam selection protocol from a plurality of beam selection protocols based on at least the signal quality and the position change information.

In Example 2, the wireless communication device of Example 1 is disclosed, wherein the beam selection protocol comprises receiving at least one iteration of a series of candidate transmit beam transmissions.

In Example 3, the wireless communication device of Example 1 or 2 is disclosed, wherein the one or more processors are one or more baseband modem processors.

In Example 4, the wireless communication device of any one of Examples 1 to 3 is disclosed, wherein the one or more processors are configured to detect signal to noise ratio when determining the signal quality.

In Example 5, the wireless communication device of any one of Examples 1 to 4 is disclosed, wherein the position data comprises at least one of Global Navigation Satellite System Data, Local Positioning System Data, Real-Time Locating System Data, Mobile Phone Tracking Data, angular rotation sensor data, rotary position sensor data, gyroscope data, or any combination thereof.

In Example 6, the wireless communication device of any one of Examples 1 to 5 is disclosed, wherein the position change information corresponds to movement of the wireless communication device relative to a fixed point.

In Example 7, the wireless communication device of any one of Examples 1 to 6 is disclosed, wherein the position change information corresponds to rotation of the wireless communication device around an axis.

In Example 8, the wireless communication device of any one of Examples 2 to 7 is disclosed, wherein the one or more processors are configured to select a first beam selection protocol in the case that the signal quality is greater than a predetermined threshold and the position change information is less than a predetermined threshold, and wherein the first beam selection protocol comprises instructions for the one or more processors to measure a signal quality of the candidate transmit beam transmissions corresponding to at least one iteration and to disable the receiver for at least one iteration of the repeated series of candidate transmit beam transmissions.

In Example 9, the wireless communication device of Example 8 is disclosed, wherein the one or more processors are further configured to select a candidate transmit beam based on the measured signal quality of the candidate transmit beam transmissions.

In Example 10, the wireless communication device of Example 8 or 9 is disclosed, wherein the one or more processors are further configured to transmit an identification of the selected candidate transmit beam.

In Example 11, the wireless communication device of any one of Examples 2 to 7 is disclosed, wherein the one or more processors are configured to select a second beam selection protocol in the case that the signal quality is greater than a predetermined threshold and the position change information is greater than a predetermined threshold, and wherein the second beam selection protocol comprises instructions for the one or more processors to measure a signal quality of a first iteration of candidate transmit beam transmissions using a first receive beam setting, and to measure a signal quality of a second iteration of candidate transmit beam transmissions using a second receive beam setting.

In Example 12, the wireless communication device of Example 11 is disclosed, wherein the one or more processors are further configured to determine a preferred transmit beam based on the measured signal quality.

In Example 13, the wireless communication device of Example 11 or 12 is disclosed, wherein the one or more processors are further configured to transmit an identity of the preferred candidate transmit beam.

In Example 14, the wireless communication device of any one of Examples 11 to 13 is disclosed, wherein the one or more processors are further configured to determine a preferred receive beam based on the measured signal quality.

In Example 15, the wireless communication device of any one of Examples 2 to 7 is disclosed, wherein the one or more processors are configured to select a third beam selection protocol in the case that the signal quality is less than a predetermined threshold and the position change information is less than a predetermined threshold, and wherein the third beam selection protocol comprises measuring a signal quality of a plurality of iterations of candidate transmit beam transmissions using a first receive beam setting.

In Example 16, the wireless communication device of Example 15 is disclosed, wherein the one or more processors are further configured to determine a preferred candidate transmit beam based on the measured signal quality.

In Example 17, the wireless communication device of Example 15 is disclosed, wherein the one or more processors are further configured to transmit an identity of the preferred candidate transmit beam.

In Example 18, the wireless communication device of any one of Examples 15 to 17 is disclosed, wherein the one or more processors are further configured to measure a signal quality of each of a plurality of candidate receive beams based on a signal quality of the preferred candidate transmit beam.

In Example 19, the wireless communication device of any one of Examples 2 to 7 is disclosed, wherein the one or more processors are configured to select a fourth beam selection protocol in the case that the signal quality is less than a predetermined threshold and the position change information is greater than a predetermined threshold, and wherein the fourth beam selection protocol comprises measuring a signal quality of an iteration of candidate transmit beams using a plurality of candidate receive beams.

In Example 20, the wireless communication device of Example 19 is disclosed, wherein each candidate transmit beam corresponds to a different candidate receive beam.

In Example 21, the wireless communication device of Example 19 or 20 is disclosed, wherein the one or more processors are further configured to determine a preferred candidate transmit beam based on the measured signal quality.

In Example 22, the wireless communication device of Example 21 is disclosed, wherein the one or more processors are further configured to transmit an identity of the preferred candidate transmit beam.

In Example 23, the wireless communication device of any one of Examples 19 to 22 is disclosed, wherein the one or more processors are further configured to perform neighbor cell detection.

In Example 24, the wireless communication device of any one of Examples 1 to 23 is disclosed, wherein the one or more processors are further configured to select a beam selection protocol based additionally on at least one of run-time channel parameter estimation results; a previous beam selection protocol selection; data from one or more external sensors; or any combination thereof.

In Example 25, the wireless communication device of Example 24 is disclosed, wherein the run-time channel parameter estimation results comprise signal to noise ratio; Doppler shift; Doppler spread estimation from demodulation reference signal to phase-tracking reference signal associated with physical broadcast channel, synchronization signals, channel state information reference signals (CSI-RS), tracking reference signals, or phase-tracking reference signals; physical downlink control channel; physical downlink shared channel; or any combination thereof.

In Example 26, the wireless communication device of Example 24 or 25 is disclosed, wherein the one or more external sensors comprise a motion sensor for motion detection of the mobile communication device; a motion sensor for rotation detection of the mobile communication device; or a global navigation satellite system sensor to detect a distance of the mobile communication device relative to a base station.

In Example 27, the wireless communication device of any one of Examples 1 to 16 is disclosed, wherein the one or more processors are configured to operate according to at least to combined features of any plurality of beamforming protocols.

In Example 28, a method of beam selection is disclosed comprising detecting position data indicating a position of a wireless communication device receiving a wireless signal; determining a signal quality of the wireless signal; determining a position change information of a position of the wireless communication device based on the detected position data; and selecting a beam selection protocol from a plurality of beam selection protocols based on at least the signal quality and the position change information.

In Example 29, the method of Example 28 is disclosed, wherein the beam selection protocol comprises receiving at least one iteration of a repeated series of candidate transmit beam transmissions.

In Example 30, the method of beam selection of Example 28 or 29 is disclosed, wherein the signal quality comprises signal to noise ratio.

In Example 31, the method of beam selection of any one of Examples 28 to 30 is disclosed, wherein the position data comprises at least one of Global Navigation Satellite System Data, Local Positioning System Data, Real-Time Locating System Data, Mobile Phone Tracking Data, angular rotation sensor data, rotary position sensor data, gyroscope data, or any combination thereof.

In Example 32, the method of beam selection of any one of Examples 28 to 31 is disclosed, wherein the position change information corresponds to movement of the wireless communication device relative to a fixed point.

In Example 33, the method of beam selection of any one of Examples 28 to 32 is disclosed, wherein the position change information corresponds to rotation of the wireless communication device around an axis.

In Example 34, the method of beam selection of any one of Examples 28 to 33 is disclosed, further comprising selecting a first beam selection protocol in the case that the signal quality is greater than a predetermined threshold and the position change information is less than a predetermined threshold, and wherein the first beam selection protocol comprises measuring a signal quality of the candidate transmit beam transmissions corresponding to at least one iteration and disabling a wireless receiver for at least one iteration of the repeated series of candidate transmit beam transmissions.

In Example 35, the method of beam selection of Example 34 is disclosed, further comprising selecting a candidate transmit beam based on the measured signal quality of the candidate transmit beam transmissions.

In Example 36, the method of beam selection of Example 34 or 35 is disclosed, further comprising transmitting an identification of the selected candidate transmit beam.

In Example 37, the method of beam selection of any one of Examples 28 to 33 is disclosed, further comprising selecting a second beam selection protocol in the case that the signal quality is greater than a predetermined threshold and the position change information is greater than a predetermined threshold, and wherein the second beam selection protocol comprises measuring a signal quality of a first iteration of candidate transmit beam transmissions using a first receive beam setting, and measuring a signal quality of a second iteration of candidate transmit beam transmissions using a second receive beam setting.

In Example 38, the method of beam selection of Example 37 is disclosed, further comprising determining a preferred transmit beam based on the measured signal quality.

In Example 39, the method of beam selection of Example 37 or 38 is disclosed, further comprising transmitting an identity of the preferred candidate transmit beam.

In Example 40, the method of beam selection of any one of Examples 37 to 39 is disclosed, further comprising determining a preferred receive beam based on the measured signal quality.

In Example 41, the method of beam selection of any one of Examples 28 to 33 is disclosed, further comprising selecting a third beam selection protocol in the case that the signal quality is less than a predetermined threshold and the position change information is less than a predetermined threshold, and wherein the third beam selection protocol comprises measuring a signal quality of a plurality of iterations of candidate transmit beam transmissions using a first receive beam setting.

In Example 42, the method of beam selection of Example 41 is disclosed, further comprising determining a preferred candidate transmit beam based on the measured signal quality.

In Example 43, the method of beam selection of Example 42 is disclosed, further comprising transmitting an identity of the preferred candidate transmit beam.

In Example 44, the method of beam selection of any one of Examples 41 to 43 is disclosed, further comprising measuring a signal quality of each of a plurality of candidate receive beams based on a signal quality of the preferred candidate transmit beam.

In Example 45, the method of beam selection of any one of Examples 28 to 33 is disclosed, further comprising selecting a fourth beam selection protocol in the case that the signal quality is less than a predetermined threshold and the position change information is greater than a predetermined threshold, and wherein the fourth beam selection protocol comprises measuring a signal quality of an iteration of candidate transmit beams using a plurality of candidate receive beams.

In Example 46, the method of beam selection of Example 45 is disclosed, wherein each candidate transmit beam corresponds to a different candidate receive beam.

In Example 47, the method of beam selection of Example 45 or 46 is disclosed, further comprising determining a preferred candidate transmit beam based on the measured signal quality.

In Example 48, the method of beam selection of Example 47 is disclosed, further comprising transmitting an identity of the preferred candidate transmit beam.

In Example 49, the method of beam selection of any one of Examples 45 to 48 is disclosed, further comprising performing neighbor cell detection.

In Example 50, the method of beam selection of any one of Examples 28 to 49 is disclosed, further comprising selecting a beam selection protocol based additionally on at least one of run-time channel parameter estimation results, a previous beam selection protocol selection, data from one or more external sensors, or any combination thereof.

In Example 51, the method of beam selection of Example 50 is disclosed, wherein the run-time channel parameter estimation results comprise signal to noise ratio; Doppler shift; Doppler spread estimation from demodulation reference signal to phase-tracking reference signal associated with physical broadcast channel; physical downlink control channel; physical downlink shared channel; or any combination thereof.

In Example 52, the method of beam selection of any one of Examples 28 to 51 is disclosed, further comprising operating according to at least two combined features of any plurality of beamforming protocols.

In Example 53, a communication device is disclosed comprising a receiver structure configured to receive position related data and a wireless signal; one or more processors, configured to: determine a signal quality information of a signal quality of the wireless signal; determine a position change information of a change of a position of the wireless communication device based on the received position related data; and select a beam selection protocol from a plurality of predefined beam selection protocols based on the signal quality information and the position change information.

In Example 54, the wireless communication device of any one of Examples 1 to 7 is disclosed, further comprising a battery sensor, configured to detect a remaining battery charge, wherein the one or more processors are further configured to select a first beam selection protocol in the case that the remaining battery charge is less than a predetermined threshold, and wherein the first beam selection protocol comprises instructions for the one or more processors to measure a signal quality of the candidate transmit beam transmissions corresponding to at least one iteration and to disable the receiver for at least one iteration of the repeated series of candidate transmit beam transmissions.

In Example 55, the wireless communication device of Example 54 is disclosed, wherein the one or more processors are further configured to select a candidate transmit beam based on the measured signal quality of the candidate transmit beam transmissions.

In Example 56, the wireless communication device of Example 54 is disclosed, wherein the one or more processors are further configured to transmit an identification of the selected candidate transmit beam.

In Example 57, the wireless communication device of any one of Examples 1 to 7 is disclosed, wherein the one or more processors are further configured to detect a number of resource elements attributed to a reference signal of a transmit beam and, in the case that the number of resource elements is greater than a predetermined threshold, to select a second beam selection protocol, and wherein the second beam selection protocol comprises instructions for the one or more processors to measure a signal quality of a first iteration of candidate transmit beam transmissions using a first receive beam setting, and to measure a signal quality of a second iteration of candidate transmit beam transmissions using a second receive beam setting.

In Example 58, the wireless communication device of Example 57 is disclosed, wherein the one or more processors are further configured to select a candidate transmit beam based on the measured signal quality of the candidate transmit beam transmissions.

In Example 59, the wireless communication device of Example 57 or 58 is disclosed, wherein the one or more processors are further configured to transmit an identification of the selected candidate transmit beam.

In Example 60, the wireless communication device of any one of Examples 1 to 27 is disclosed, wherein the position data comprises at least one of satellite positioning service data; a change of estimated angle of arrivals; estimation of Doppler shift or spread; a change of a channel parameter over time; a change of received signal power; a change of delay spread; a change of timing advance (TA); or any combination thereof.

In Example 61, the method of any one of Examples 28 to 52 is disclosed, wherein the position data comprises at least one of satellite positioning service data; a change of estimated angle of arrivals; estimation of Doppler shift or spread; a change of a channel parameter over time; a change of received signal power; a change of delay spread; a change of timing advance (TA); or any combination thereof.

In Example 62, the wireless device of Example 57 is disclosed, wherein the number of resource elements attributed the reference signals of the transmit beam are a number of resource elements for the configured beam management CSI-RS resource.

In Example 63, a means for wireless communication is disclosed comprising two or more radio frequency receiving means for receiving a wireless signal; one or more signal receiving means detecting position data indicating a position of the means for wireless communication and processing the wireless signal for one or more processing means; the one or more processing means, for determining a signal quality of the wireless signal; determining a position change information of a position of the means for wireless communication based on the detected position data; and for selecting a beam selection protocol from a plurality of beam selection protocols based on at least the signal quality and the position change information.

In Example 64, the means for wireless communication of Example 63 is disclosed, wherein the beam selection protocol comprises receiving at least one iteration of a series of candidate transmit beam transmissions.

In Example 65, the means for wireless communication of Example 63 or 64 is disclosed, wherein the one or more processing means are one or more baseband modems.

In Example 66, the means for wireless communication of any one of Examples 63 to 65 is disclosed, wherein the one or more processing means are configured to detect signal to noise ratio when determining the signal quality.

In Example 67, the means for wireless communication of any one of Examples 63 to 66 is disclosed, wherein the position data comprises at least one of Global Navigation Satellite System Data, Local Positioning System Data, Real-Time Locating System Data, Mobile Phone Tracking Data, angular rotation sensor data, rotary position sensor data, gyroscope data, or any combination thereof.

In Example 68, the means for wireless communication of any one of Examples 63 to 67 is disclosed, wherein the position change information corresponds to movement of the means for wireless communication relative to a fixed point.

In Example 69, the means for wireless communication of any one of Examples 63 to 68 is disclosed, wherein the position change information corresponds to rotation of the means for wireless communication around an axis.

In Example 70, the means for wireless communication of any one of Examples 64 to 69 is disclosed, wherein the one or more processing means are configured to select a first beam selection protocol in the case that the signal quality is greater than a predetermined threshold and the position change information is less than a predetermined threshold, and wherein the first beam selection protocol comprises instructions for the one or more processing means to measure a signal quality of the candidate transmit beam transmissions corresponding to at least one iteration and to disable the receiver for at least one iteration of the repeated series of candidate transmit beam transmissions.

In Example 71, the means for wireless communication of Example 70 is disclosed, wherein the one or more processing means are further configured to select a candidate transmit beam based on the measured signal quality of the candidate transmit beam transmissions.

In Example 72, the means for wireless communication of Example 70 or 71 is disclosed, wherein the one or more processing means are further configured to transmit an identification of the selected candidate transmit beam.

In Example 73, the means for wireless communication of any one of Examples 70 to 69 is disclosed, wherein the one or more processing means are configured to select a second beam selection protocol in the case that the signal quality is greater than a predetermined threshold and the position change information is greater than a predetermined threshold, and wherein the second beam selection protocol comprises instructions for the one or more processing means to measure a signal quality of a first iteration of candidate transmit beam transmissions using a first receive beam setting, and to measure a signal quality of a second iteration of candidate transmit beam transmissions using a second receive beam setting.

In Example 74, the means for wireless communication of Example 73 is disclosed, wherein the one or more processing means are further configured to determine a preferred transmit beam based on the measured signal quality.

In Example 75, the means for wireless communication of Example 73 or 74 is disclosed, wherein the one or more processing means are further configured to transmit an identity of the preferred candidate transmit beam.

In Example 76, the means for wireless communication of any one of Examples 73 to 75 is disclosed, wherein the one or more processing means are further configured to determine a preferred receive beam based on the measured signal quality.

In Example 77, the means for wireless communication of any one of Examples 64 to 69 is disclosed, wherein the one or more processing means are configured to select a third beam selection protocol in the case that the signal quality is less than a predetermined threshold and the position change information is less than a predetermined threshold, and wherein the third beam selection protocol comprises measuring a signal quality of a plurality of iterations of candidate transmit beam transmissions using a first receive beam setting.

In Example 78, the means for wireless communication of Example 77 is disclosed, wherein the one or more processing means are further configured to determine a preferred candidate transmit beam based on the measured signal quality.

In Example 79, the means for wireless communication of Example 77 is disclosed, wherein the one or more processing means are further configured to transmit an identity of the preferred candidate transmit beam.

In Example 80, the means for wireless communication of any one of Examples 77 to 79 is disclosed, wherein the one or more processing means are further configured to measure a signal quality of each of a plurality of candidate receive beams based on a signal quality of the preferred candidate transmit beam.

In Example 81, the means for wireless communication of any one of Examples 64 to 69 is disclosed, wherein the one or more processing means are configured to select a fourth beam selection protocol in the case that the signal quality is less than a predetermined threshold and the position change information is greater than a predetermined threshold, and wherein the fourth beam selection protocol comprises measuring a signal quality of an iteration of candidate transmit beams using a plurality of candidate receive beams.

In Example 82, the means for wireless communication of Example 81 is disclosed, wherein each candidate transmit beam corresponds to a different candidate receive beam.

In Example 83, the means for wireless communication of Example 81 or 82 is disclosed, wherein the one or more processing means are further configured to determine a preferred candidate transmit beam based on the measured signal quality.

In Example 84, the means for wireless communication of Example 83 is disclosed, wherein the one or more processing means are further configured to transmit an identity of the preferred candidate transmit beam.

In Example 85, the means for wireless communication of any one of Examples 81 to 84 is disclosed, wherein the one or more processing means are further configured to perform neighbor cell detection.

In Example 86, the means for wireless communication of any one of Examples 63 to 85 is disclosed, wherein the one or more processing means are further configured to select a beam selection protocol based additionally on at least one of run-time channel parameter estimation results; a previous beam selection protocol selection; data from one or more external sensors; or any combination thereof.

In Example 87, the means for wireless communication of Example 86 is disclosed, wherein the run-time channel parameter estimation results comprise signal to noise ratio; Doppler shift; Doppler spread estimation from demodulation reference signal to phase-tracking reference signal associated with a synchronization signal block (SSB), channel state information reference signals (CSI-RS), tracking reference signals, or phase-tracking reference signals; physical downlink control channel; physical downlink shared channel; or any combination thereof.

In Example 88, the means for wireless communication of Example 86 or 87 is disclosed, wherein the one or more external sensors comprise a motion sensor for motion detection of the mobile communication device; a motion sensor for rotation detection of the mobile communication device; or a global navigation satellite system sensor to detect a distance of the mobile communication device relative to a base station.

In Example 89, the means for wireless communication of any one of Examples 62 to 88 is disclosed, wherein the one or more processing means are configured to operate according to at least to combined features of any plurality of beamforming protocols.

In Example 90, a non-transient computer readable medium is disclosed, which is configured to perform the method of any one of examples 28 to 52.

What is claimed is:
1. A wireless communication device comprising:
    two or more antennas, configured to receive a wireless signal;
    one or more receivers, configured to detect position data indicating a position of the wireless communication device and to process the wireless signal for one or more processors;
    the one or more processors, configured to:
        determine a signal quality of the wireless signal;
        determine a position change information of a position of the wireless communication device based on the detected position data; and
        select a beam selection protocol from a plurality of beam selection protocols based on at least the signal quality and the position change information.
2. The wireless communication device of claim 1, wherein the position change information corresponds to movement of the wireless communication device relative to a fixed point.

3. The wireless communication device of claim 1, wherein the position change information corresponds to rotation of the wireless communication device around an axis.

4. The wireless communication device of claim 2, wherein the one or more processors are configured to select a first beam selection protocol if that the signal quality is greater than a predetermined threshold and the position change information is less than a predetermined threshold, and wherein the first beam selection protocol comprises instructions for the one or more processors to measure a signal quality of a candidate transmit beam transmissions corresponding to at least one iteration and to disable the receiver for at least one iteration of a repeated series of candidate transmit beam transmissions.

5. The wireless communication device of claim 4, wherein the one or more processors are further configured to select a candidate transmit beam based on the measured signal quality of the candidate transmit beam transmissions and to transmit an identification of the selected candidate transmit beam.

6. The wireless communication device of claim 2, wherein the one or more processors are configured to select a second beam selection protocol if the signal quality is greater than a predetermined threshold and the position change information is greater than a predetermined threshold, and wherein the second beam selection protocol comprises instructions for the one or more processors to measure a signal quality of a first iteration of candidate transmit beam transmissions using a first receive beam setting, and to measure a signal quality of a second iteration of candidate transmit beam transmissions using a second receive beam setting.

7. The wireless communication device of claim 6, wherein the one or more processors are further configured to determine a preferred transmit beam based on the measured signal quality and to transmit an identity of the preferred candidate transmit beam.

8. The wireless communication device of claim 2, wherein the one or more processors are configured to select a third beam selection protocol if the signal quality is less than a predetermined threshold and the position change information is less than a predetermined threshold, and wherein the third beam selection protocol comprises measuring a signal quality of a plurality of iterations of candidate transmit beam transmissions using a first receive beam setting.

9. The wireless communication device of claim 8, wherein the one or more processors are further configured to determine a preferred candidate transmit beam based on the measured signal quality and to transmit an identity of the preferred candidate transmit beam.

10. The wireless communication device of claim 9, wherein the one or more processors are further configured to measure a signal quality of each of a plurality of candidate receive beams based on a signal quality of the preferred candidate transmit beam.

11. The wireless communication device of claim 2, wherein the one or more processors are configured to select a fourth beam selection protocol if the signal quality is less than a predetermined threshold and the position change information is greater than a predetermined threshold, and wherein the fourth beam selection protocol comprises measuring a signal quality of an iteration of candidate transmit beams using a plurality of candidate receive beams.

12. The wireless communication device of claim 11, wherein each of the plurality of candidate transmit beam corresponds to a different candidate receive beam.

13. The wireless communication device of claim 12, wherein the one or more processors are further configured to determine a preferred candidate transmit beam based on the measured signal quality and to transmit an identity of the preferred candidate transmit beam.

14. The wireless communication device of claim 1, wherein the one or more processors are further configured to select a beam selection protocol based additionally on at least one of run-time channel parameter estimation results; a previous beam selection protocol selection; data from one or more external sensors; or any combination thereof.

15. The wireless communication device of claim 14, wherein the run-time channel parameter estimation results comprise signal to noise ratio; Doppler shift; Doppler spread estimation from demodulation reference signal to phase-tracking reference signal associated with a synchronization signal block (SSB), channel state information reference signals (CSI-RS), tracking reference signals, or phase-tracking reference signals; physical downlink control channel; physical downlink shared channel; or any combination thereof.

16. A method of beam selection comprising:
    detecting position data indicating a position of a wireless communication device receiving a wireless signal;
    determining a signal quality of the wireless signal;
    determining a position change information of a position of the wireless communication device based on the detected position data; and
    selecting a beam selection protocol from a plurality of beam selection protocols based on at least the signal quality and the position change information.

17. The method of beam selection of claim 16, further comprising selecting a first beam selection protocol if the signal quality is greater than a predetermined threshold and the position change information is less than a predetermined threshold, and wherein the first beam selection protocol comprises measuring a signal quality of the candidate transmit beam transmissions corresponding to at least one iteration and disabling a wireless receiver for at least one iteration of a repeated series of candidate transmit beam transmissions.

18. The method of beam selection of claim 16, further comprising selecting a second beam selection protocol if the signal quality is greater than a predetermined threshold and the position change information is greater than a predetermined threshold, and wherein the second beam selection protocol comprises measuring a signal quality of a first iteration of candidate transmit beam transmissions using a first receive beam setting, and measuring a signal quality of a second iteration of candidate transmit beam transmissions using a second receive beam setting.

19. The method of beam selection of claim 16, further comprising selecting a third beam selection protocol if the signal quality is less than a predetermined threshold and the position change information is less than a predetermined threshold, and wherein the third beam selection protocol comprises measuring a signal quality of a plurality of iterations of candidate transmit beam transmissions using a first receive beam setting.

20. The method of beam selection of claim 16, further comprising selecting a fourth beam selection protocol if the signal quality is less than a predetermined threshold and the position change information is greater than a predetermined threshold, and wherein the fourth beam selection protocol comprises measuring a signal quality of an iteration of candidate transmit beams using a plurality of candidate receive beams.

21. A means for wireless communication beam selection comprising:
    the one or more processing means for:
        determining a signal quality of a wireless signal;
        determining from detected position data a position change information of a position of the means for wireless communication beam selection; and
        selecting a beam selection protocol from a plurality of beam selection protocols based on at least the signal quality and the position change information.

\* \* \* \* \*